Figure 1:
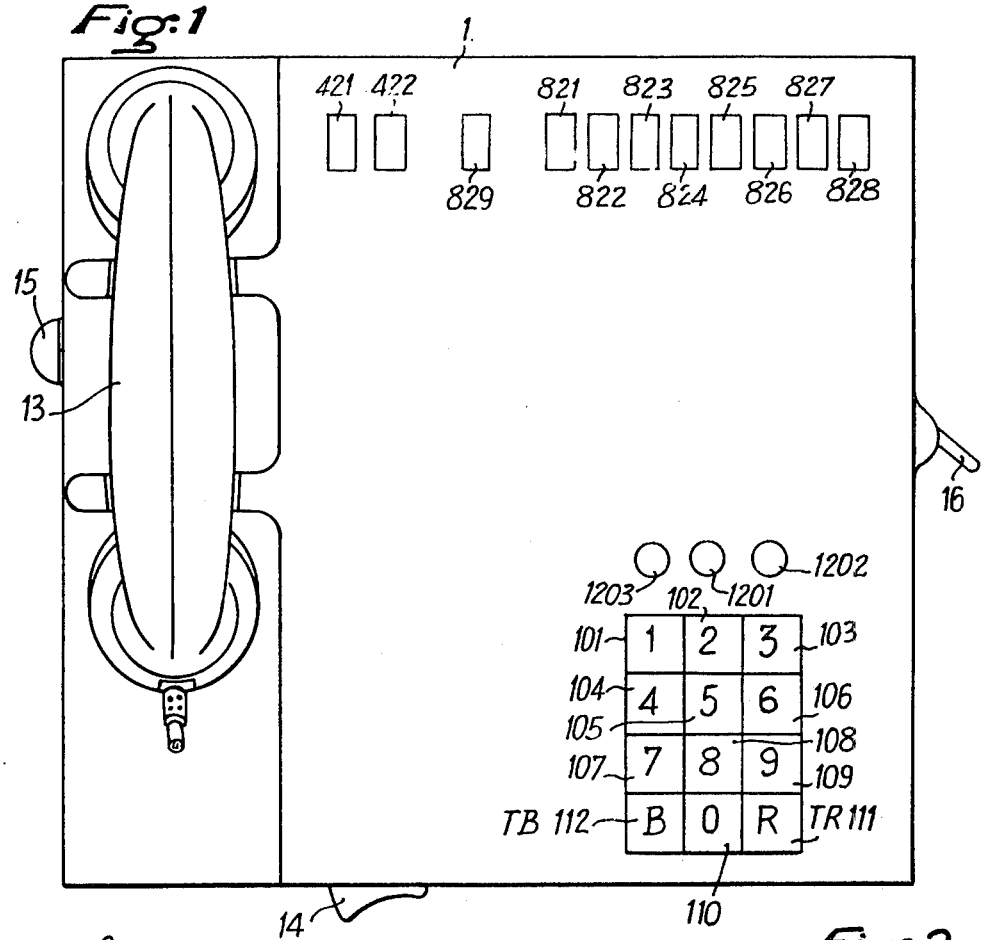

United States Patent [19]

Derveaux

[11] 4,053,718
[45] Oct. 11, 1977

[54] AUTOMATIC TELEPHONE CALL GENERATOR

[75] Inventor: Oscar Derveaux, Paris, France

[73] Assignee: Soprogespar Societe de Promotion et de Gestion de Participations, Paris, France

[21] Appl. No.: 626,221

[22] Filed: Oct. 28, 1975

[30] Foreign Application Priority Data

Oct. 30, 1974 France .................. 74.36317

[51] Int. Cl.² ............................................. H04M 1/51
[52] U.S. Cl. ................................................. 179/90 B
[58] Field of Search .......... 179/90 AW, 90 B, 90 BD, 179/2 DP, 18 DA

[56] References Cited

U.S. PATENT DOCUMENTS

| | | | |
|---|---|---|---|
| 3,662,118 | 5/1972 | Phoenix et al. ..................... | 179/90 B |
| 3,670,111 | 6/1972 | Bukosky et al. .................. | 179/90 BD |
| 3,735,050 | 5/1973 | Mardas .............................. | 179/90 B |
| 3,860,765 | 1/1975 | McCabe et al. .................... | 179/90 B |
| 3,873,781 | 3/1975 | Nissim .............................. | 179/81 R |
| 3,882,284 | 5/1975 | Munday ............................. | 179/90 B |
| 3,920,926 | 11/1975 | Lenaerts et al. ................... | 179/90 B |
| 3,922,646 | 11/1975 | Bevnon et al. ..................... | 179/90 B |
| 3,932,709 | 1/1976 | Hoff et al. ........................ | 179/90 B |
| 3,943,300 | 3/1976 | Stevenson .......................... | 179/90 B |

Primary Examiner—Kathleen H. Claffy
Assistant Examiner—Gerald L. Brigance
Attorney, Agent, or Firm—Brisebois & Kruger

[57] ABSTRACT

The invention relates to an automatic telephone call generator comprising a keyboard having digital keys emitting digital signals and function keys each emitting a special signal, a memory store comprising a plurality of memory location registers having a predetermined capacity, an addressing device for the said memory location registers of the said store, means for writing the digits of the coded call numbers in binary coded form in the said store, a reading register of the digital signals read in the store, a call pulse emitter and a control circuit of the said call pulse emitter, wherein the generator only comprises two function keys and each memory location register can contain one or two call numbers each having a random number of digits, whereby the total number of digits is less than the memory location register capacity less one unit, wherein the two call numbers of one and the same memory location register are on recording separated by a first special signal, wherein the final part of the memory location register beyond the first number, if there is only one, or beyond the second number if there are two is filled by second special signals, and wherein the apparatus comprises detectors of the first and second special signals, means for commencing the reading of the store either at the start of a selected memory location register or at the first special signal detected by the said special signal detector and for stopping this reading at the first special second signal detected by the said detector.

16 Claims, 16 Drawing Figures

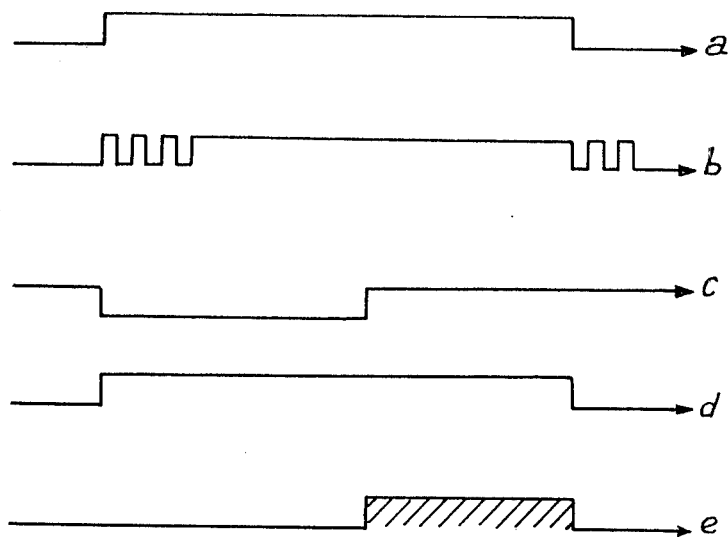
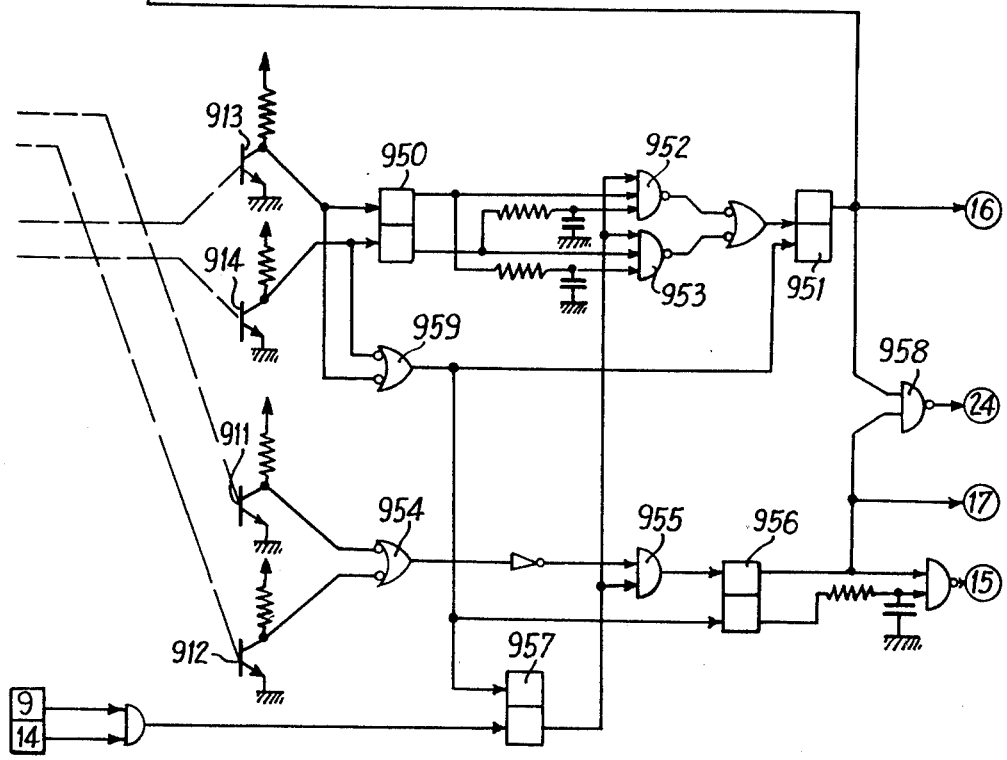

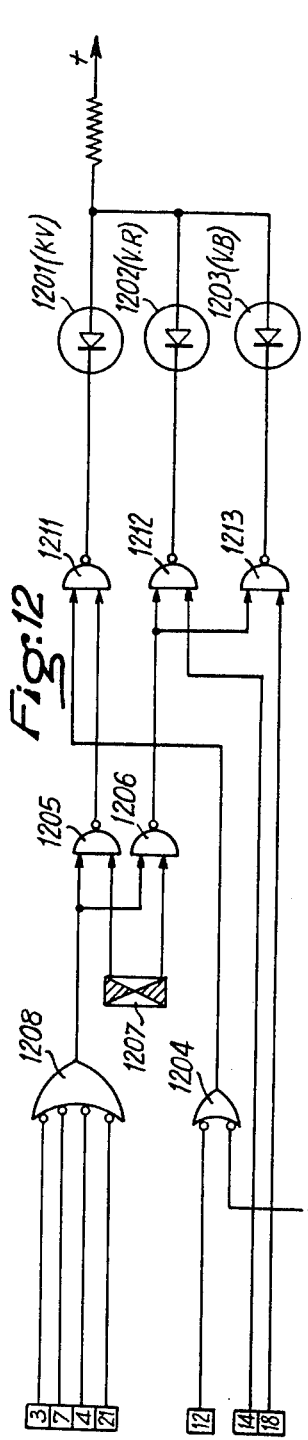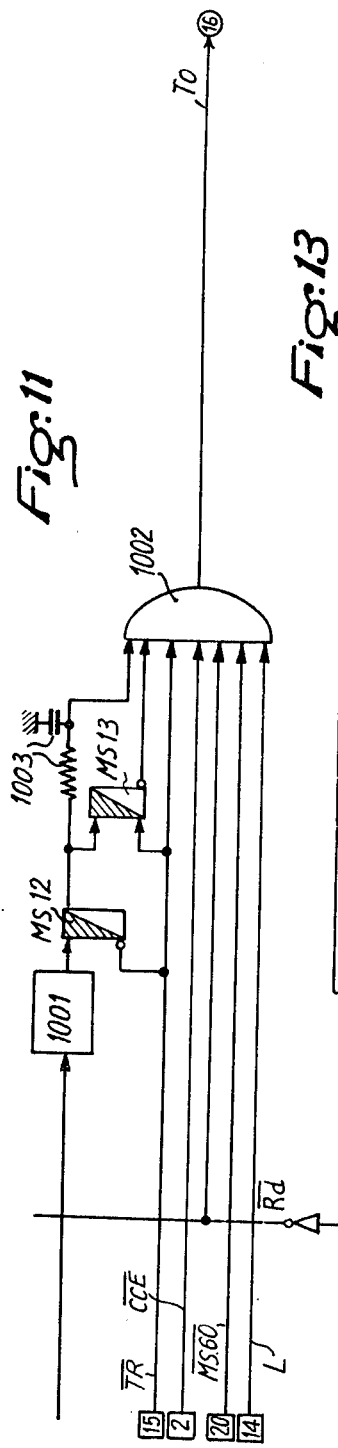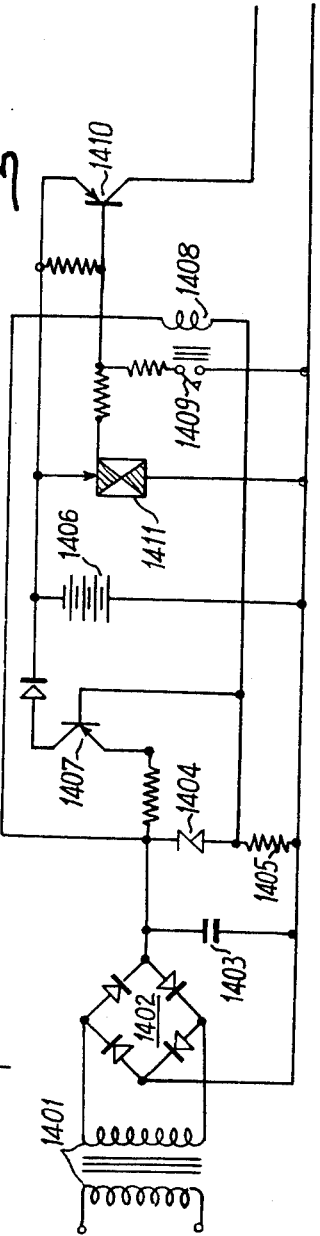

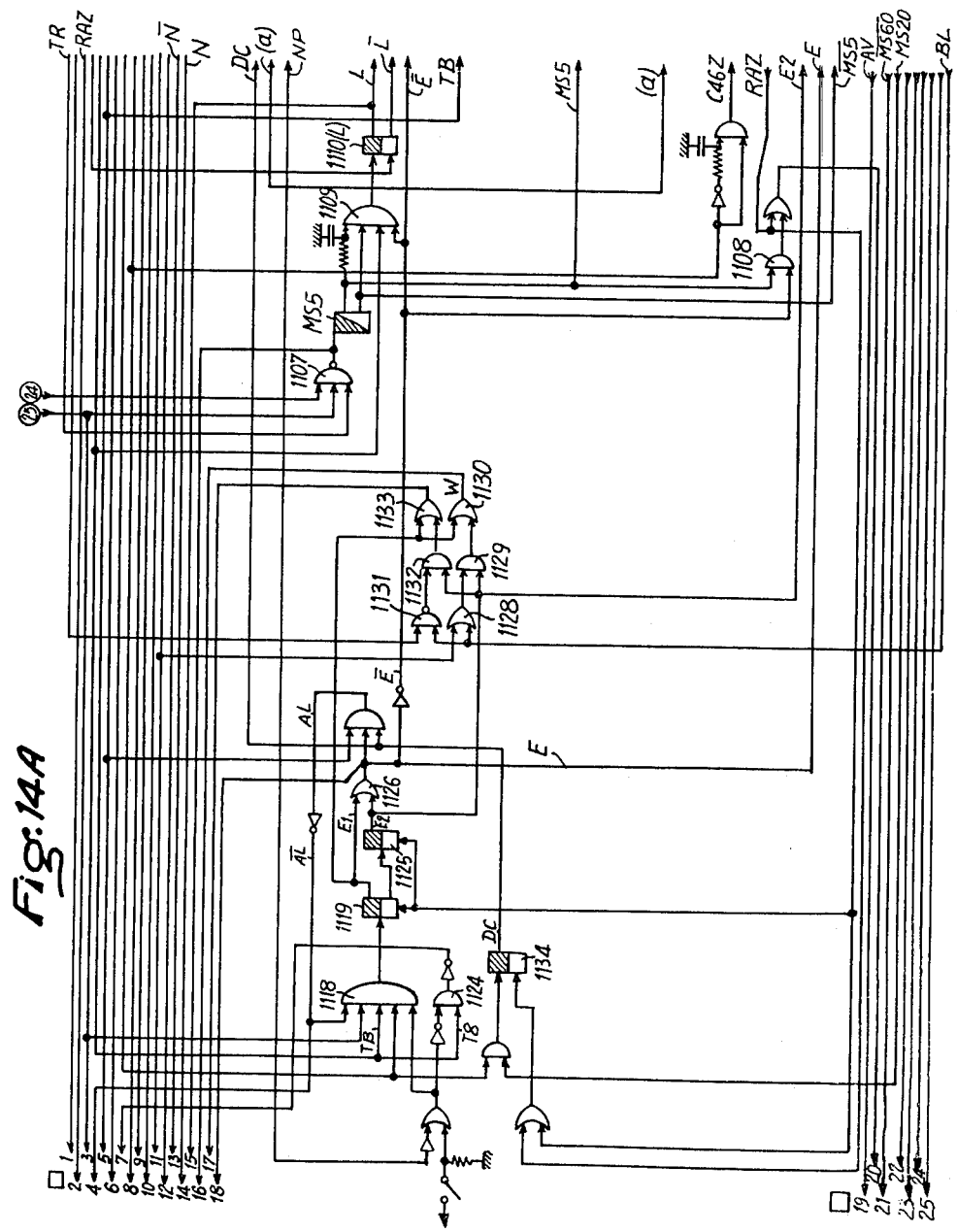

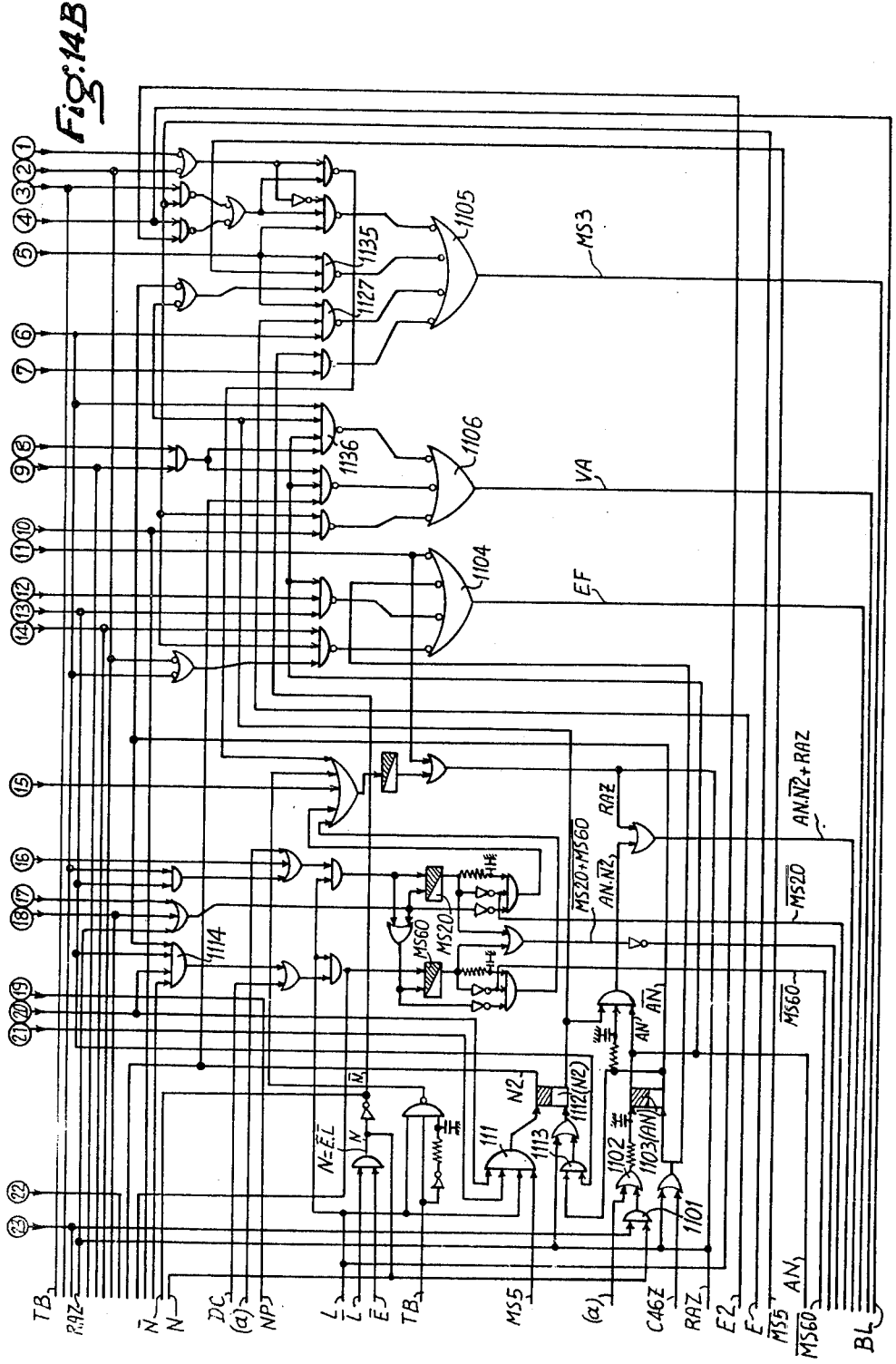

Fig.15

Figure 4:
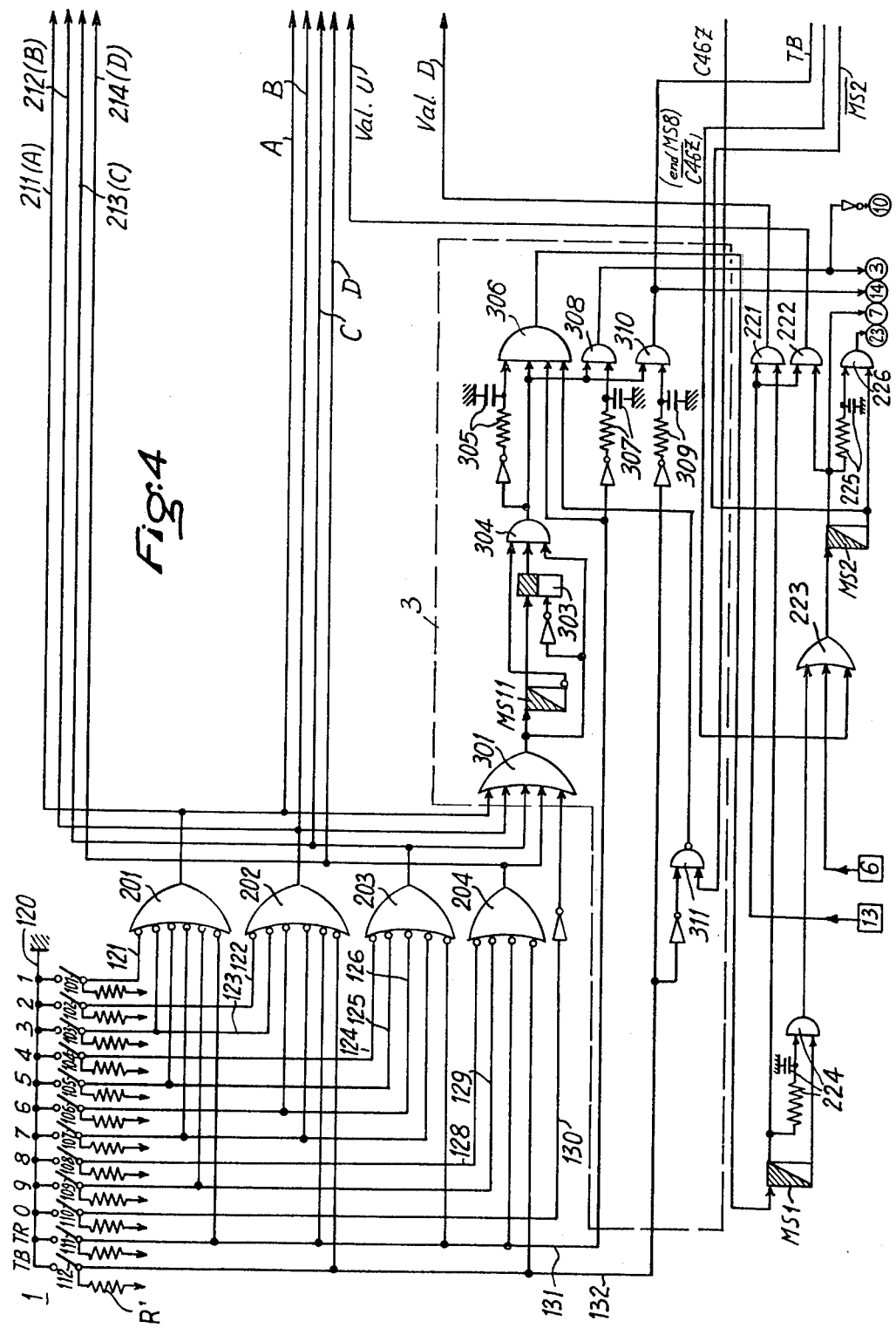
Figure 5:
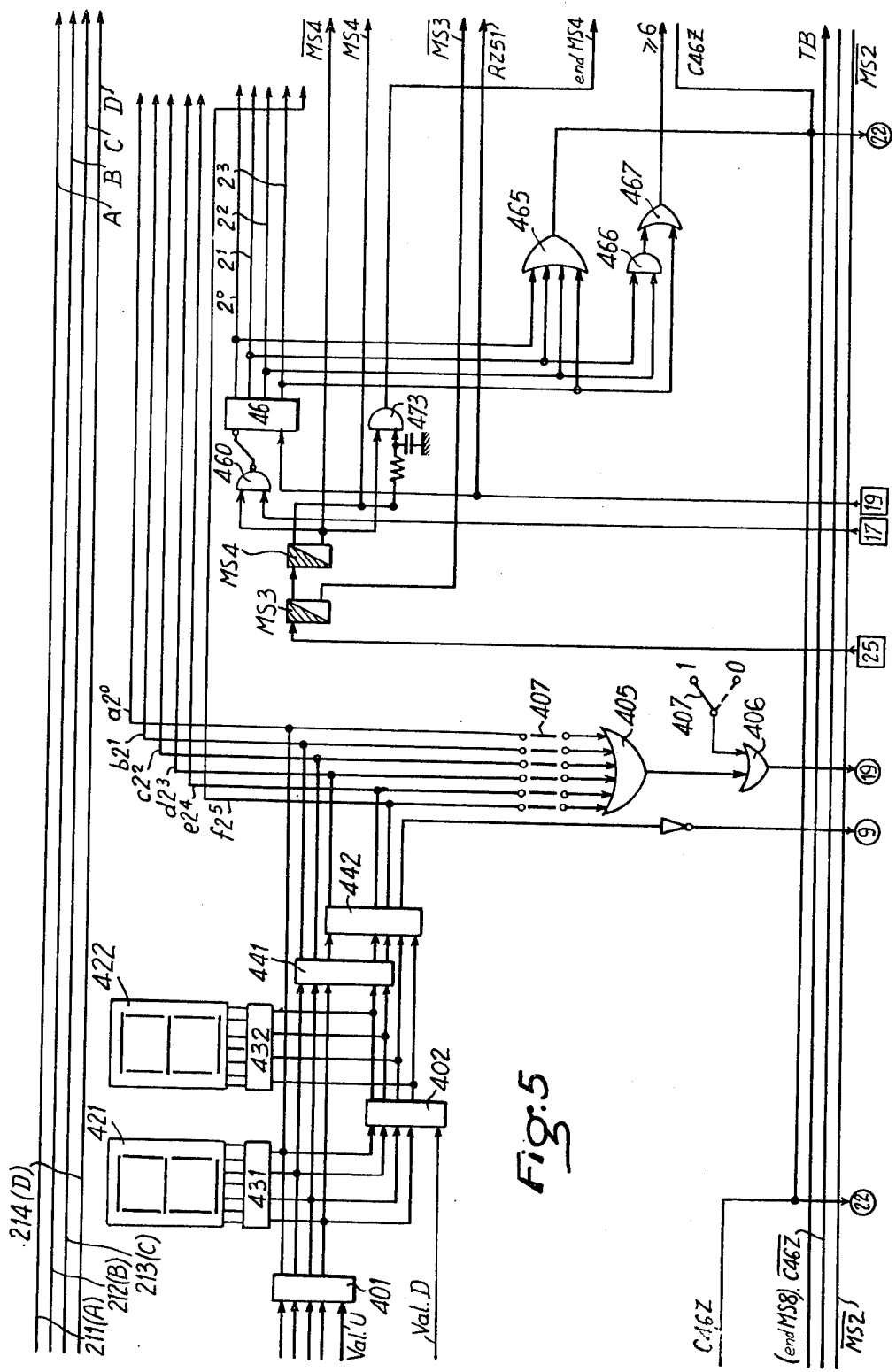
Figure 6:
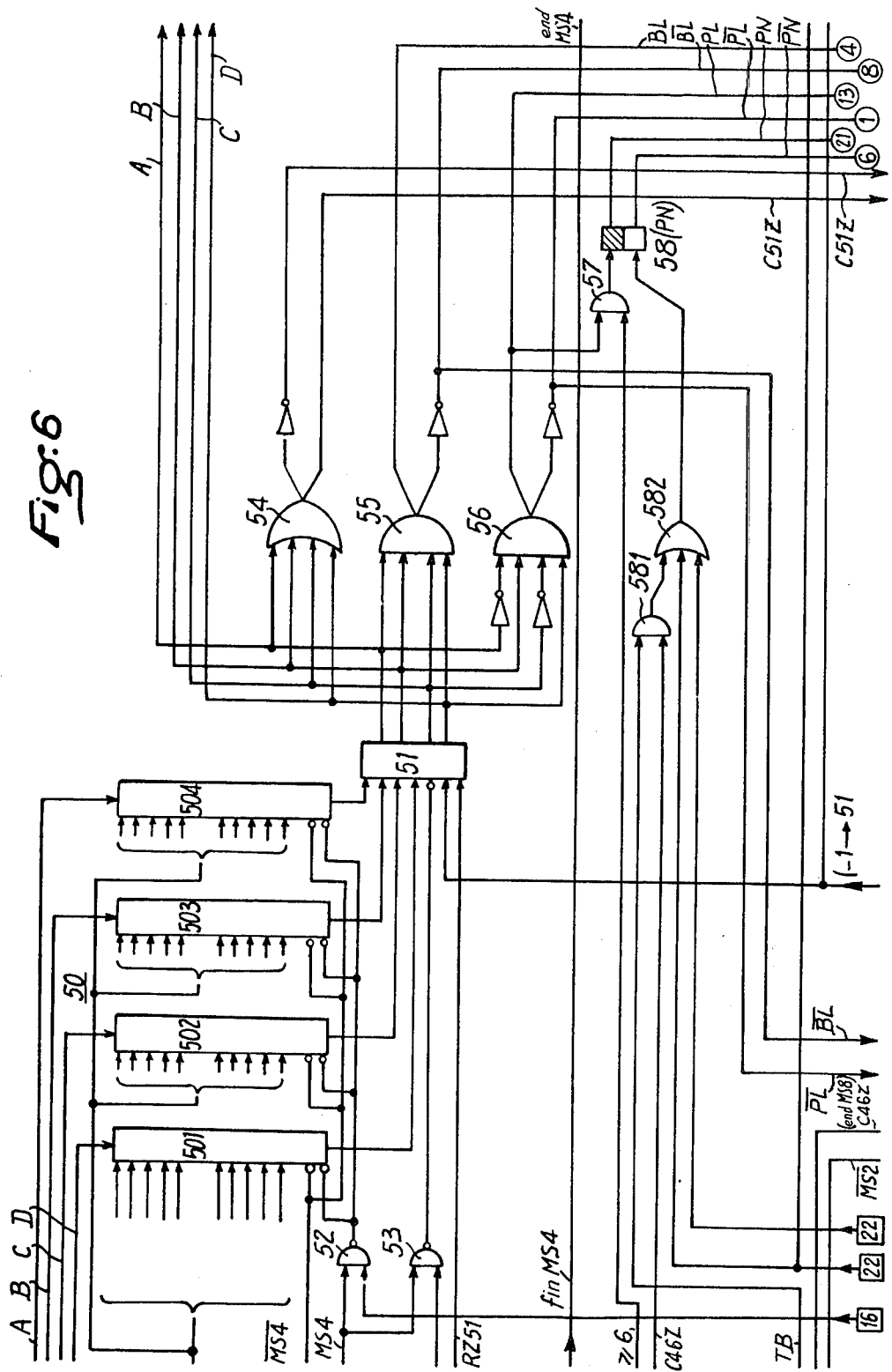
Figure 7:
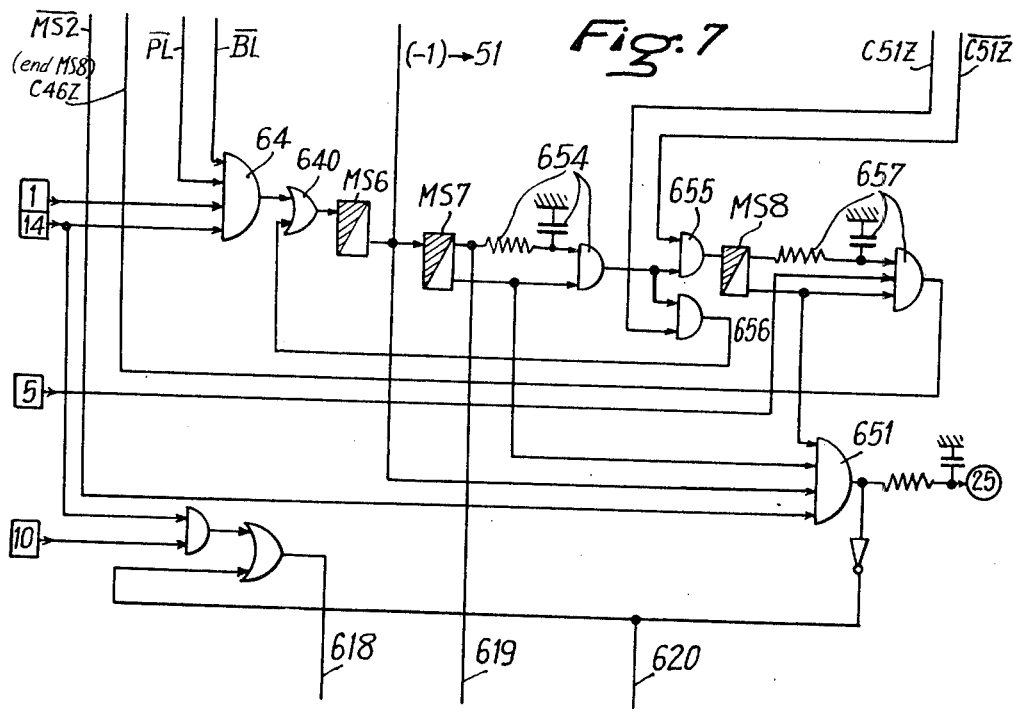
Figure 8:
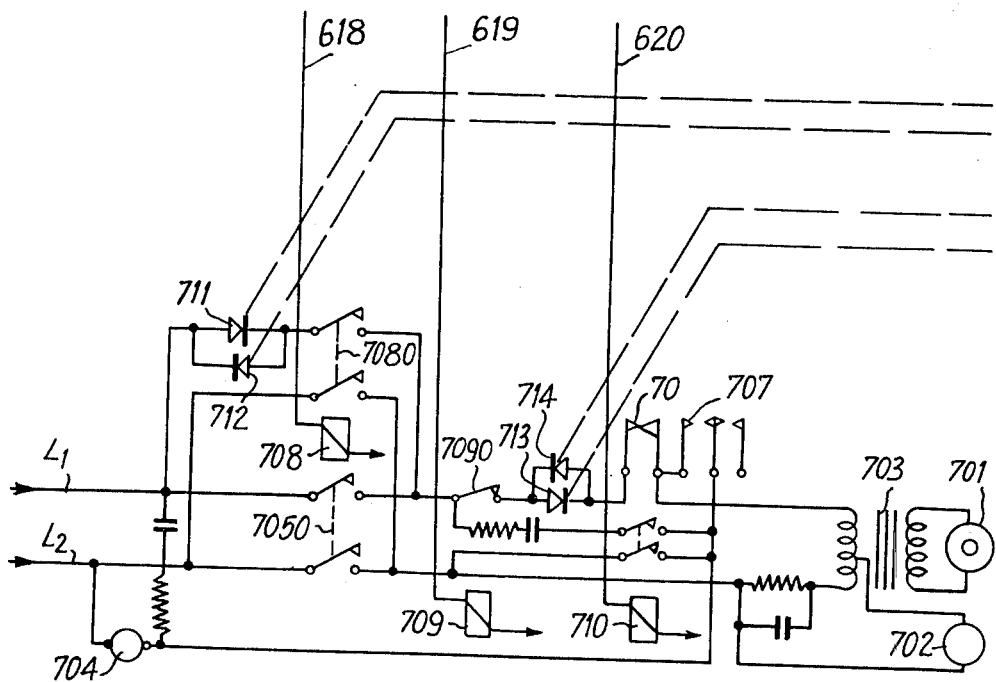
Figure 9:
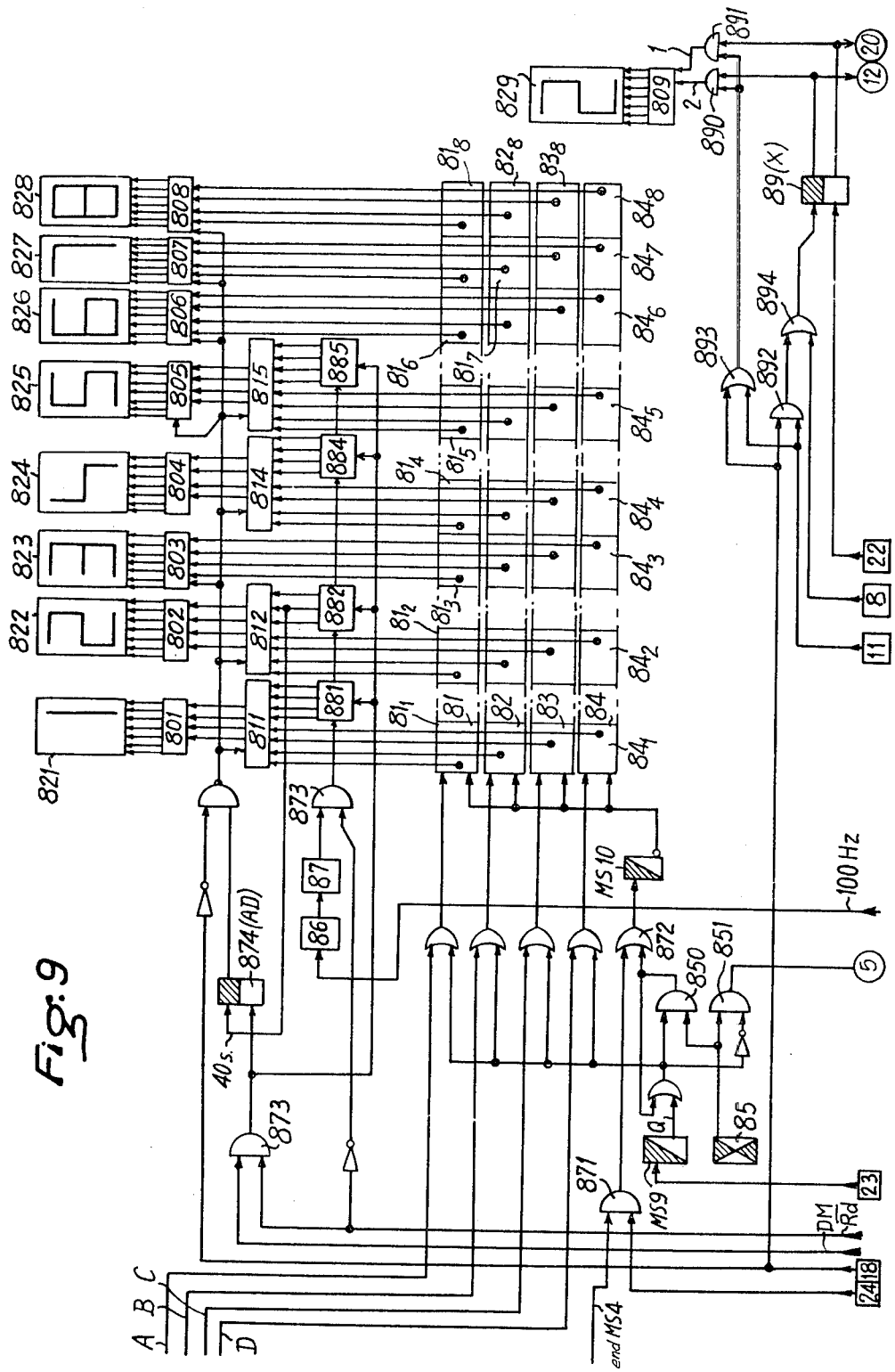

| Fig.9 | Figs.11 et 12 | Fig.10 |
|---|---|---|
| Fig.6 | Fig.7 | Fig.8 |
| Fig.5 | | |
| Fig.4 | | |

AUTOMATIC TELEPHONE CALL GENERATOR

The present invention relates to an automatic telephone call generator and more particularly to an apparatus of this type having an electronic store.

There are numerous prior art automatic telephone call generators. They use stores of various types such as cam discs, magnetic tapes or electronic stores. Whatever the type of store used, these comprise a predetermined number of storage locations each serving to contain a telephone number. These storage locations therefore have a capacity corresponding to the telephone numbers having the largest number of digits which the apparatus is able to emit.

However, at present telephone operations and more particularly trunk and international operations involve telephone numbers with a variable number of digits, and certain of them are in two parts, i.e. a prefix and the actual number. Thus, whereas for example a French grouping number has only six digits, in the case of a number in the United Kingdom or the German Federal Republic the dialling of thirteen digits is involved. Thus, there is a ratio of the order of two between short and long numbers. Consequently in the prior art apparatuses, the memory capacity is not used to the best advantage.

An object of the present invention is to provide an automatic telephone call generator which uses a store having storage locations or memory location registers able to contain two telephone numbers following one another and separated by a separating character. Thus, each memory location register has a maximum predetermined capacity, but is not separated into two parts each having a predetermined capacity. As an example, the capacity of a memory location register is sixteen characters, and two telephone numbers can be recorded whereby the sum of their numbers of digits is equal to or less than fifteen, whereby one of the characters must be a separating character. However, from the moment that this sum remains equal to or below fifteen each number can have a random number of digits.

Although each memory location register can contain one or two telephone numbers, and although the start of the second number does not correspond to a fixed address in the store, means and preferably in the form of a single key are provided for addressing in writing and reading the start of this second number. To this end, the character placed at the end of a single number and the character separating the end of the first number and the beginning of the second number are characters differing from one another and differing from the characters representing decimal digits and these will hereinafter be called "blank" and "pause" characters.

The time unit charge for certain telephone calls is relatively high and the user wishes to know the cost of his telephone call.

The present invention makes it possible to provide an automatic telephone call generator comprising a display device for the number dialled by the operator and means for using this same display device for displaying the duration of the call.

In the prior art automatic telephone call generators, the apparatus fulfills the function of dialling the number and sometimes displaying it, as well as that of detecting the invitation to transmit signal, the occupied signal and the calling signal of the person called. However, these apparatuses do not have a detector for the reply of the person called and for the caller lifting the receiver.

The automatic telephone call generator according to the invention comprises a detector for the reply of the person called (polarity reversal of the line wires) and of the lifting of the receiver by the caller, means for indicating to the caller the reply of the person called and means for returning the apparatus to the rest position if the operator does not lift the receiver during a predetermined period. Consequently, the apparatus is entirely automatic in the sense that the operator does not have to lift her hand-set to bring about the despatch by the exchange of the invitation to transmit tone until the number is despatched on the telephone line, the operator does not have to wait on her lifted hand-set for the reply of the person called and if absent for a sufficiently long time not to lift the receiver within the predetermined period the apparatus will detect this and return automatically to the rest position. Thus, in summarising the operator does not have to lift the apparatus until the person called has been obtained.

The apparatus according to the invention fulfills other functions, has other characteristics and advantages and these will be gathered from the following detailed description, but at this stage reference will be made thereto by briefly describing its construction and operation.

The apparatus substantially comprises a MOS-store organized into 64 memory location registers having sixteen digits, a keyboard having ten digital keys plus two function keys, a displayer of the number, the duration of the call and the address of the memory location register selected and three indicator lamps. For reference purposes, it will be assumed that one of the function keys is red and the other blue, and that one of the indicator lamps is green, the second red and the third blue. The apparatus also comprises a line occupancy relay connected in parallel to the hook switch contacts and an emission relay connected in series with the dial contacts. It can be in one of the three following states: neutral, recording or writing, emission or reading.

On making live the apparatus is in the neutral state where it is possible to select one of the 64 memory location registers by dialling its address by means of the digital keys of the keyboard. This address is displayed on the displaying device. When an address is displayed in this way the stored number at this address or the first number if there are two at the address in question is displayed in the displaying device. If there is only one number recorded, a special displayer of the display device remains extinguished. If there are two, the special displayer displays 1 to indicate that there are two of them, but that it is the first number which is displayed by the displaying device.

If by error an address is dialled which is equal to or greater than 64 and which corresponds to no memory location register, no number will appear in the displaying device and the green indicator lamp will blink to show the error. Moreover, it is not possible to pass to reading or writing. It is necessary to change the address.

To record a number after having dialled an address, it is necessary to press on the blue key. The green indicator lamp is extinguished and the blue indicator lamp lights up. Certain of the addresses are protected in the sense that the number or numbers appearing therein must be retained and it is therefore forbidden to cancel them or substitute new numbers for them. The protection can only be eliminated by means of a key. On pressing down the blue key after having selected a protected memory location register the apparatus remains in the neutral state and the green indicator lamp blinks to indicate the error.

As the blue key is depressed and the address is not protected, the desired number is dialled on the keyboard. The action on the blue key cancels the preceding number and the new number is displayed as it is being dialled.

If it is a number having a prefix it is necessary to record a pause signal after the prefix by pressing down the blue key. When the number is recorded it is necessary to press down the red key to return the system to the neutral state (green indicator lamp illuminated).

If two numbers are recorded in succession, e.g. two numbers each having seven digits, they must be separated by a pause signal. It is then necessary to again press down the blue key after recording the first number. The first number displayed disappears and the special displayer displays the number 2 indicating that it is the second number at the same address. The second number dialled is displayed as it is being dialled. If by error more than sixteen digits are dialled the blue key blinks to indicate the error.

If at the selected address there are already one or two numbers recorded, and if in the first case it is desired to record a second number, or if in the second case it is desired to modify the second number without it being necessary to re-dial the first, it is merely necessary to depress the blue key twice in succession. The number 2 appears on the special displayer, the previously displayed second number disappears, and it is now only necessary to re-dial the new second number as if there had been no other number in its place. Thus, it is possible to record a second number in a memory location register without it being necessary to re-record the first no matter whether the location of the second number is free or is already occupied by a number.

However, if it is desired to modify the first of the two numbers, it is normally recorded and then a pause is dialled with the blue key and then the red key is returned to the neutral state.

If after dialling once or twice the blue key the operator has a change of mind and it is desired to return to the neutral state without cancelling the number or numbers recorded, it is merely necessary to depress the red key before recording the smaller digit.

To automatically transmit a number after selecting the requisite address, the red key is depressed without lifting the hand-set. The red indicator lamp lights up and blinks until the indication to transmit tone is received. The red indicator lamp stops blinking two seconds after the arrival of this tone and the automatic transmission process commences.

When transmission is at an end the red indicator lamp blinks again waiting for the person called, whereby the red and green indicator lamps simultaneously blink when the latter lifts the receiver. It is then necessary to lift the hand-set to commence the conversation. Immediately the apparatus returns to the neutral position, i.e. the red indicator lamp is extinguished and the green indicator lamp is illuminated.

After 40 seconds the duration of the call from the time that the person called has lifted the receiver is displayed in the displaying device in place of the number. This 40-second period permits the operator to observe the number called for the case where, the call having been mis-routed the question is asked "What number are you calling?"

During the call numbers can be recorded because there has been a return to the neutral position. Operation takes place as indicated for recording. The display of the duration disappears and the number dialled is displayed progressively as the number is dialled. The depression of the red key to return to the neutral position cancels the recorded number and the duration of the call re-appears.

When the person called hangs up the metering of the call period stops with the new polarity reversal of the line wires and the total duration of the conversation is available. On hanging up the number dialled or the number recorded during the cal re-appears.

An automatic device returns the apparatus to the neutral state:

20 Seconds after depressing the red key if the invitation to transmit tone does not arrive;

60 Seconds after the emission of the number if the person called does not reply;

20 Seconds after the person called answers if the operator does not lift the hand-set.

If the number comprises a prefix transmission stops after the prefix awaiting the second tone. The red indicator lamp again blinks until the said tone is obtained. A second 20-second delay is started off at the end of which the apparatus returns to the neutral state if the second tone does not arrive.

If two numbers are recorded at the selected address, the second can be obtained when the first does not reply or is engaged by depressing the red key a second time. If it is desired to obtain the second number without the first the red key is depressed twice in succession. If it is desired to obtain the first number after a first unsuccessful attempt, the red button is depressed twice in succession so as to skip the second. On starting the transmission of the second number the latter is displayed in place of the first and the number 2 appears in the special displayer.

MOS-stores require a permanent power supply, otherwise the information contained therein will be lost. It is therefore conventional to provide a booster battery to supply the same in case of a mains failure. The battery must have a large capacity in case the power failure is of long duration.

According to the invention, only a small capacity booster battery is used, e.g. 0.5 ampere hours and in the case of a power failure this booster battery supplies a pulse generator of low consumption whose pulses are transmitted to the store as retaining pulses. However, it is not possible to read or write in the store during a pulsed supply period. Thus, by means of low capacitance booster batteries it is possible to retain the information in the store during long mains failures. Thus, for example the operator can disconnect the power supply when going on vacation and is sure to find the automatic telephone call generator operating on her return from vacation.

Figure 2:
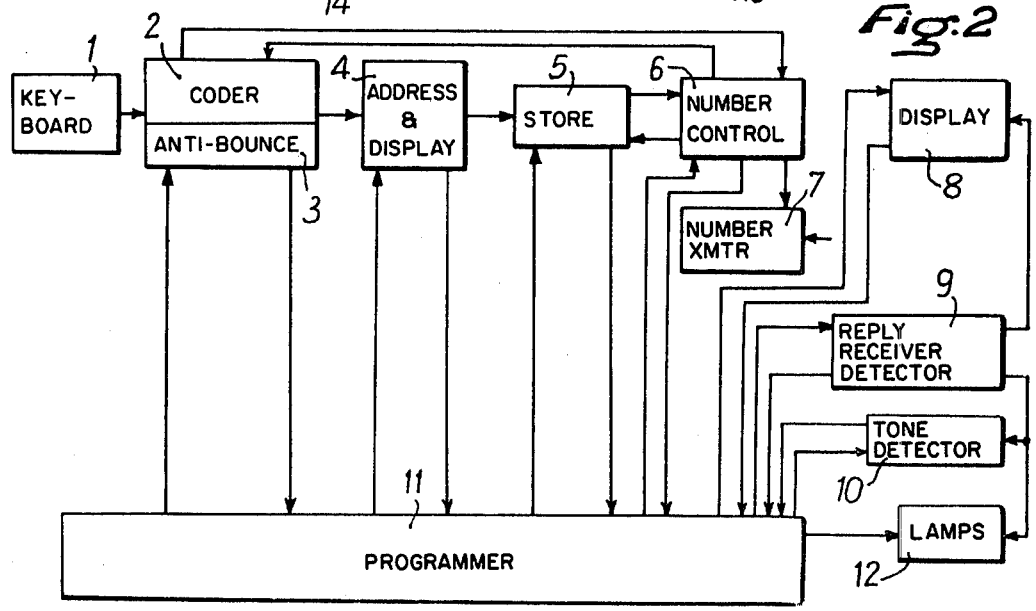

The invention will now be described in detail relative to the attached drawings wherein show:

FIG. 1, the front face of the automatic telephone call generator;

FIG. 2, in the form of a block diagram the apparatus according to the invention;

FIG. 3, a signal diagram explaining the operation of the anti-bounce device of FIG. 4;

FIG. 4, the keyboard, the "1 among 12" "binary coded decimal" coder and the anti-bounce device;

FIG. 5, a system for addressing the store displaying the address and protecting certain numbers;

FIG. 6, the store and its validation and reading system;

FIG. 7, the number transmission control circuit;

FIG. 8, the number transmitter;

FIG. 9, the display device;

FIG. 10, the detector of the reply of the called person and of the caller lifting the receiver;

FIG. 11, the tone detector;

FIG. 12, the indicator lamps;

FIG. 13, the energising device for the store in the case of a mains failure;

FIGS. 14A and 14B, the programmer;

FIG. 15, the assembly drawing of FIGS. 4, 5, 6, 7, 8, 9, 10, 11 and 12.

In the drawings the wires coming from the programmer and entering each operational circuit are referenced by a number in a square, whereby this number is that of the output terminal of the programmer and the wires leading to the programmer from each circuit are referenced by a number in a circle, whereby this number is that of the input terminal of the programmer. When a signal is produced by a circuit and is used in another without passing via the programmer the wire traversed by this signal joins the two operational circuits in question by directly traversing the interpositioned operational circuits. The path of the wire in question can be followed without difficulty by arranging the drawings in accordance with the assembly drawing of FIG. 15.

Reference will be firstly made to FIG. 1 showing the front face of the automatic telephone call generator. It comprises a keyboard 1 having ten digital keys 101 to 110, a red key TR 111 and a blue key TB 112, three indicator lamps, namely a green lamp 1201, a red lamp 1202 and a blue lamp 1203 which can either be extinguished, illuminated or blinking, eleven displayers 421 and 422 which serve to display the selected memory location register, number 829 serving to display the number 1 or the number 2 depending on whether the first or second number of a memory location register is written or read, and 821 to 828 for displaying the read or written number. The hand-set of a telephone 13 rests on the latter via a cradle. A stop-go button 14 makes it possible to put into operation or stop the apparatus. A button 15 permits the control of a potentiometer regulating the sound volume of the loud-speaker, whilst the apparatus also has a key 16.

Reference will now be made to FIG. 2 where the apparatus comprises a keyboard 1, already seen in FIG. 1, a coder 2 coding the address signals and the signals representative of the numbers emitted by the keys in binary coded decimal form, an anti-bounce device 3, a system 4 for addressing the number store and displaying the addresses of the numbers in the store, a store 5, a number transmission control circuit 6, a number transmitter 7, a device for displaying the numbers and the call duration 8, a detector 9 which detects the lifting of the receiver by the called person and the caller, a detector 10 of the invitation to transmit tone and a programmer 11. The programmer 11 controls a system of indicator lamps 12. The store is energised by a power supply device (FIG. 13).

CHAPTER I: KEYBOARD (FIG. 4)

Keyboard 1 is used for the selection of the memory location registers and for the recording and reading of stored numbers.

As already stated, it comprises twelve keys 101 to 112, twelve outgoing connections 121 to 132 and a common wire 120 connected to earth, i.e. to the zero logic of the apparatus. If none of the keys is depressed the corresponding outgoing connections are connected to a logic system via resistors R'. If one of the keys of the keyboard is depressed this earths the outgoing connection of the depressed key. The ten keys 101 to 110 are digital keys corresponding to the ten digits of the decimal number. The two keys 111 and 112 are function keys. The eleventh key is a red key TR 111 and the twelfth key is a blue key TB 112.

Connections 121 to 132 are connected to the inputs of a coder 2 which converts a signal on one wire among the twelve into a word having four bits A, B, C, D in parallel on the four wires 211 to 214. As regards the digital keys the code A, B, C, D is the binary coded decimal code relative to the decimal number carried by the key. As regards the red key TR 111, A, B, C, D equals 1111 (i.e. the blank signal or second special signal) and as regards the blue key TB 112, A, B, C, D equals 1010 (i.e. the pause signal or first special signal). Besides a blank and pause character respectively the red and blue keys emit a signal which is respectively TR and TB.

CHAPTER II: ADDRESS AND NUMBER CODER AND ANTI-BOUNCE DEVICE (FIG. 4)

Coder 2 comprises four OR gates having reversing inputs 201 to 204 and it is associated with an anti-bounce device 3 which serves to prevent the use of coded words when the keyboard key is not stablised. This device causes a time lag between the time when the key comes into contact with the earth of the keyboard and that where a use authorisation signal appears which is called a strobe.

The anti-bounce device comprises OR gate 301 which receives four gates 201 to 204, the four bits A, B, C, D of the word and the zero signal, a mono-stable circuit MS 11, a flip-flop 303 and an AND gate 304.

In FIG. 3 the line $a$ represents the duration of depressing the keyboard key and the line $b$ the signal on the outgoing connection of this key. The beginning and end of the action on the key gives rise to bounces translated into pulses. Mono-stable circuit MS 11 acts on the first front of the input signal of line $b$ and supplies at its output $\overline{Q}$ a pulse of predetermined length (line $c$ in FIG. 3). Flip-flop 303 receives the output signal from mono-stable circuit MS 11 which brings it into state 1 and the signal with bounces, whose terminal bounces return it to the state 0. The signal of line $d$ occurs at the output of flip-flop 303. The switching time of mono-stable circuit MS 11 is longer than the longest period occupied by the bounces. The AND gate 304 receives the signals from lines $b$, $c$, $d$ of FIG. 3 and supplies the output signal of line $e$ which has no bounces.

The signal from AND gate 304 is differentiated in the circuit comprising circuit RC 305 and AND gate 306. The strobe signal occurs at the output of AND gate 306. All the digital keys and blue key TB 112 (in the latter case except when the C 46Z signal is at 1 (referred to hereinafter) give rise to a strobe signal when operated. Moreover, the red key TR 111 gives rise to the TR signal due to differentiating circuit 307 and AND gate 308 and blue key TB 112 gives rise to the TB signal due to differentiating circuit 309 and AND gate 310.

In addition to its differentiating function relative to the output signal of AND gate 304, AND gate 306 is dependent on the $\overline{TR}$ signal which inhibits this gate when the TR key is depressed and a signal formed by the AND NO gate 311 taking account of the C 46Z signal, which inhibits the said gate when the blue key is depressed.

The strobe signal is applied to the mono-stable circuit MS 1, whose output 1 is connected to an AND gate 221 which produces a validation signal Val. D and whose zero output is connected to a mono-stable circuit MS 2 via the differentiating circuit 224 and the OR gate 223. The output 1 of the mono-stable circuit MS 2 is connected to an AND gate 222 which produces a validation signal Val. U. Gates 221 and 222 are controlled by a signal N (apparatus in neutral position), which will be dealt with hereinafter.

CHAPTER III: STORE ADDRESSING AND ADDRESS DISPLAYING SYSTEM (FIG. 5)

The store addressing and display circuit 4 comprises two cascade registers 401 which registers the units and 402 which registers tens which store the value of the bits applied to their inputs when they receive respectively the validation signals Val. U and Val. D.

On depressing the key corresponding to the tens, after the time lag of the anti-bounce system 3 this action triggers off a signal which firstly opens AND gate 221, then AND gate 222, thereby giving rise successively to signals Val. D and Val. U. The Val. D signal causes the transfer of the previous content of the unit register 401 to the tens register 402. The Val. U signal causes the transfer of the tens to the unit register 401. If the key corresponding to units is now depressed signals Val. D and Val. U are successively emitted. Signal Val. D causes the transfer of the tens provisionally contained in the units register 401 to the tens register 402 and the Val. U signal causes the transfer of the units to the units register 401. Thus the two registers 401 and 402 store in binary form the value of the address of the memory location register which it is desired to select.

The outputs of the two registers 401 and 402 are respectively connected to the inputs of "seven bit binary coded decimal" code converters 431 and 432 which control displayers 421 and 422.

The outputs of the two registers 401 and 402 are also connected to "(binary coded decimal) (binary)" code converters 441 and 442. Thus the address of the store whose decimal digits have been dialled on the keyboard appears in binary form $a, b, c, d, e, f$ at the output of code converters 441 and 442 where $a, b, c, d, e, f$ are respectively the bits of binary weight 0 to 5 of the address of the digit to be read or written in the store. As the operator can dial any decimal number having two digits from 00 to 99, whereas she should in fact only dial the decimal numbers between 00 and 63 because the store only has 64 memory location registers, the appearance of an address whose digit of binary weight 6 is one represents a dialling error. This one of binary weight 6 is called signal ($\geq 64$). It will be shown hereinafter how this signal is used. Store 50 which will be described in greater detail in Chapter IV has 32 columns and 64 memory location registers grouped in twos in each column. Each memory location register has 16 lines. The addressing of the column is carried out in "1 among 32" code and the addressing of the line in "1 among 16" code.

Weight bits $a, b, c, d, e$ of the overall address are applied to the input of the column address register and bit $f$ is applied as a binary weight bit 4 to the input of the line address register. The binary weight bits 0, 1, 2 and 3 of the line address register are supplied by an ordinal counter 46. This counter is controlled by incrementation pulses supplied to mono-stable circuit MS 3 by the programmer through an AND NO gate 460 which is itself validated or invalidated by a signal (+1 in 46) supplied by the programmer. It is zeroed by a signal (RZ 46).

All the outputs $2^0$ to $2^3$ of counter 46 are connected to an OR gate 465 which supplies a signal when at least one of the said outputs is in the state 1. This is the signal $\overline{C\ 46Z}$, a complement of signal C 46Z to which reference was made hereinbefore.

Outputs $2^1$, $2^2$ of counter 46 are connected to an AND gate 466 and the output of this gate and the output $2^3$ of counter 46 are connected to an OR gate 467. At the output of the latter gate a signal called "$\geq 6$" is obtained which indicates that counter 46 which partly constitutes the line address register of store 50 has arrived at or exceeded the sixth line. The signal "$\geq 6$" combined with the pause signal serves to distinguish the case of two numbers in the same memory location register where a single number has a prefix.

The protection of the memory location registers against cancellation is performed in the following way:

The six addressing bits $a, b, c, d, e, f$ are applied to an OR gate 405 by replaceable conductive straps or U-links 404 and inverters. The output of gate 405 is connected to an OR gate 406 whose second input is connected via a switch 407 either to zero or to a logic system. Gate 406 produces the signal NP. If at least one of the addressing bits is a one the output of 404 is a one and the output of 406 is also a one whatever the position of switch 407. If all the addressing bits are zeros the output of 404 is a zero and the signal NP then depends solely on the position of switch 407. The principle of protection is to eliminate certain U-links in such a way that certain addresses present themselves as a result of the eliminated U-links as the zero address at the input of gate 404.

On eliminating the strap corresponding to the addressing bit of weight $2^i$ the addresses from $2^i$ to $2^{i+1} - 1$ are freed.

Summarising, it is always possible to record in free memory location registers. To record in a protected memory location register the switch must be placed in the position 1, in which position the switch cannot be removed. However, in the protection position it can be removed so that it is not available to the operators authorised to change the protected numbers.

CHAPTER IV: STORE (FIG. 6)

Store 50 is an MOS-type store comprising four modules 501 to 504 each having 1024 bits and which respectively serve to contain bits A, B, C, D corresponding to the decimal digits of the call numbers. Each module 501 to 504 comprises a matrix of 32 lines and 32 columns. Each column constitutes two memory location registers each having 16 bits, i.e. a total of 64 registers per module.

The first 32 memory location registers have as the column address 00 to 31 and their bits occupy lines 00 to 15. The second 32 memory location registers also have 00 to 31 as their column address and their bits occupy lines 16 to 31. The bit $f$ of binary weight 5 designates either the first or the second group of memory location registers depending whether it is equal to 0 or 1. As stated hereinbefore the low weight bits $a, b, c, d, e$ of the address are applied to the input of the column address register and the high weight bit $f$ to the input of the line address register 46. Depending on the value of $f$, in this way the first line of the first register or the first line (sixth line of the matrix) of the second register is addressed.

The general validation signal of store 50 is supplied by mono-stable circuit MS 4. The writing signal is supplied by mono-stable circuit MS 4 through an AND NO gate 52 controlled by writing signal W formed in the manner to be indicated hereinafter.

The outputs of the four modules 501 to 504 are connected to the four inputs of a four-bit reading register 51 whose charge is controlled by a signal supplied by mono-stable circuits MS 3 and MS 4 through the AND NO gate 53. The two mono-stable circuits MS 3 and MS 4 are connected in cascade and the AND NO gate 53 is connected to output 0 of MS 3 and to the output 1 of MS 4. The switching period of MS 4 is greater than that of MS 3. Thus, register 51 which is controlled between the end of switching of MS 3 and the end of switching of MS 4 is only opened for charging when store 50 has been addressed.

Register 51 is zeroed by a signal (RZ 51). Register 51 has a negative count or deduction input which receives the signal ($-1$ in 51) supplied by the number transmission control circuit 6. Thus, register 51 is a reading deducting register.

The four outputs of register 51 are connected to the three gates 54, 55 and 56. Gate 54 is an OR gate which detects signal 51Z, i.e. the "empty reading deducting register" signal. Gate 55 is an AND gate which detects the blank signal BL=1111 and gate 56 is also an AND gate which detects the pause signal PL=1010.

The PL signal and the ($\geq 6$) signal are applied to an AND gate 57 whose output is connected to a flip-flop 58 which supplies PN and $\overline{PN}$ signals. Thus the PN signal is a memorised signal supplied by a flip-flop whilst the PL signal is a spurious signal supplied by the register 51 of store 50. The PN signal is a memorised pause signal which comes into play when the red pause PL has a row at least equal to six in the number being read.

Flip-flop 58 is zeroed by signals TB. C46 Z, AN.$\overline{N2}$ or RZ by means of gates 581 and 582.

Store 5 transmits signals BL, PL and PN to the programmer. It receives therefrom signals TB, C $\overline{46Z}$, AN.$\overline{N2}$, W, RZ 51 and RAZ. It receives from the display and addressing system of address 4 the signals (end of MS 3, start of MS 4 and end of MS 4). It receives the negative count or deducting signal ($-1$ in 51) from the number transmission control circuit 6.

CHAPTER V: NUMBER EMISSION CONTROL CIRCUIT (FIG. 7)

As a result of differentiating circuit 225 and AND gate 226 mono-stable circuit MS 2 supplies an end of switching pulse (end of MS 2) which is applied to the AND gate 64 at the same time as the signals $\overline{PL}, \overline{BL}$ and L (the formation of the latter will be studied hereinafter). The output of gate 64 is connected via an OR gate 640 to a mono-stable circuit MS 6 whose output zero is connected to a second mono-stable circuit MS 7 as well as to the deducting connection of register 51 to which it transmits signals ($-1$ in 51). The output of mono-stable circuit MS 7 is connected via the differentiating circuit 654 on the one hand to AND gate 655 and a third mono-stable circuit MS 8 and on the other to the AND gate 656 and to the input of the OR gate 640. Output one of mono-stable circuit MS 7 is connected to the numbering relay 709 by connection 619.

All the elements of the loop from 640 to 656 form a numbering generator. In the embodiment shown mono-stable circuit MS 6 has a switching time of 33 ms, mono-stable circuit MS 7 a switching time of 66 ms and mono-stable circuit MS 8 a switching time of 1 second. Obviously these switching times can have different values as a function of local standards. The arrival of the trigger signal (end of MS 2) triggers the circulation on loop 640-MS 6-MS 7-654-656 because gate 656 is opened by signal $\overline{C\ 51Z}$ given that register 51 contains a decimal digit. Negative counting or deducting pulses are despatched to register 51 and 33 ms numbering pulses separated by 66 ms gaps are despatched to numbering relays 709. When register 51 is empty gate 54 supplies the signal C 51Z which closes gate 656 and opens gate 655. The loop is open and mono-stable circuit MS 8 is brought into state one and starts to use up its switching time of 1 second.

The output of mono-stable circuit MS 8 is connected to a differentiating circuit 657 which produces a signal (end of MS 8) under condition $\overline{C\ 46Z}$. This signal is applied to the OR gate 223 and triggers mono-stable circuit MS 2. A new digit of the call number is introduced into register 51 and this digit is transmitted as hereinbefore.

Up to now it can be seen that the apparatus has two types of sequence. The first sequence is a step-by-step manual sequence which is used for recording a number. Striking the keys of the keyboard makes the ordinal counter 46 advance. The second sequence is a slow automatic sequence which is used for transmitting a call number. The first red digit is transmitted in the form of decimal pulses on the telephone line at the rhythm of the clock constituted by the two mono-stable circuits MS 6 and MS 7. The duration of this phase depends on the number of pulses corresponding to the figure to be transmitted. At the end of this pulse train mono-stable circuit MS 8 imposes a delay of one second, at the end of which a new transmission cycle is triggered. In these two types of sequence each transmission cycle is triggered by mono-stable circuit MS 2. The duration of each sequence is linked with factors not connected with the apparatus. In the first type of sequence this is constituted by the speed at which the operator dials the number, and in the second the administrative numbering standards.

The apparatus uses a third type of sequence which is automatic and rapid and will be described hereinafter.

The number transmission control circuit 6 receives from programmer 11 signals $\overline{BL}, \overline{PL}, L, \overline{C\ 46Z}$ and TR and from the addressing system 4 signals $\overline{MS\ 2}$ and the end of MS 2. It despatches to the addressign system the end of MS 8 signal. It controls the number transmitter 7 by connections 618, 619, 620.

CHAPTER VI: NUMBER TRANSMITTER (FIG. 8)

FIG. 8 shows the telephone used in the apparatus. Although the type of telephone used is unimportant from the standpoint of the invention, it is assumed that it is a modified S 63 telephone. It comprises mouthpiece 702, receiver 701, differential transformer 703, bell 704, hook switch dial contact 706 and receiver short-circuit contact 707. It also comprises three relays 708, 709 and 710 and two pairs of opto-electronic coupling devices. Each opto-electronic coupling device comprises an electroluminescent diode 711 to 714 and a photo-transistor 911 to 914.

Relay 708 is a line occupancy relay whose contact 7080 are in parallel with contact 7050 of the hook switch. Contact 7090 of relay 709 is in series with the dial contact. Relay 710 is the receiver short-circuit relay. Relay 708 is connected to control circuit 6 by connection 618. Relay 709 is connected to output one of mono-stable circuit MS 7 by connection 619. Via connection 620 relay 710 receives the CCE signal supplied by the AND gate 651 whose inputs are connected to the zero outputs of MS 2, MS 6, MS 7 and MS 8.

The opto-electronic coupling devices shown in FIG. 8 by their electroluminescent diodes are fitted head to tail in pairs in such a way that one of the two electroluminescent diodes is ignited in whichever direction the current travels (if a current is in fact flowing).

CHAPTER VII: DISPLAY DEVICE (FIG. 9)

The outputs of register 51 are connected to a display device 8 comprising four staggered registers 81, 84. Each staggered register has eight stages respectively $81_1$ to $81_8$, $82_1$ to $82_8$, $83_1$ to $83_8$, $84_1$ to $84_8$. The four stages of each row $81_i$, $82_i$, $83_i$, $84_i$ ($1 \leq i \leq 8$) are connected to code converters respectively 801 to 808 which convert the four bit words representing the decimal digits into seven bit words intended for display. In the case of certain code converters the connection with the staggered registers is not direct but takes place via branching circuits or multiplexers 811, 812, 814, 815. Code converters 801 to 808 are connected to luminous displayers 821 to 828.

As was seen relative to FIG. 5 the validation of register 51 took place between the end of switching of MS 3 and the end of switching of MS 4. Signal MS 4 is differentiated in differentiating circuit 473 (FIG. 5) in such a way as to obtain an end of MS 4 signal. As it is not desired to systematically transfer all the data read in register 51 into display device 8, clock pulses are circulated which advance the staggered registers by AND gate 871 which is controlled by a display validation signal VA supplied by programmer 11. The output of AND gate 871 is connected to the mono-stable display circuit MS 10 via OR gate 872.

However, in certain cases it is necessary to cancel all displays. If the staggered registers 81 to 84 where merely zeroed a series of zeros would be displayed. To obviate this disadvantage displayers are used which remain extinguished if the blank signal =1111 is applied thereto. These ones are supplied by the astable flip-flop 85 under the control of a mono-stable deleting circuit MS 9. The output of the mono-stable deleting circuit MS 9 controls the AND gate 850 through which pass the bits supplied by the astable flip-flop 85.

Alongside displayers 821 to 828 is provided a displayer 829 which informs the operator whether a first number or a second number is being written or read in a memory location register. This displayer is controlled by a flip-flop 89 through AND gates 890 and 891 and a "four bit - seven bit" code converter 809 of the same type as code converters 801 to 808. Flip-flop 89 is controlled in the manner to be described hereinafter and it produces a signal X. The apparatus displays the duration of the call. To this end it comprises a clock giving the second which is constituted by two counters 86 and 87 counting up to ten mounted in cascade and energised by 100 Hz clock pulses obtained by rectifying and shaping the 50 Hz mains current.

The 1 Hz clock pulses from 87 are applied through an AND gate 873, whose control system will be described hereinafter, to a tens counter 881, a sixers counter 882 and two tens counters 884 and 885, all four being mounted in cascade. Counter 881 counts seconds from 0 to 9, counter 882 tenths of seconds from 0 to 6, counter 884 minutes from 0 to 9 and counter 885 tenths of minutes from 0 to 9. Thus, this device makes it possible to count up to 99 minutes and 59 seconds.

The display of the content of counters 881, 882, 884, 885 uses displayers 821, 822, 824 and 825 among the eight displayers used for displaying the number. These displayers are supplied by counters 881, 882, 884 and 885 via multiplexers 811, 812, 814 and 815. A selection signal applied to the multiplexers makes it possible to display either the call number or the call duration.

If the duration is displayed the same selection signal applied to multiplexers 811, 812, 814 and 815 is also applied to code converters 803, 806, 807 and 808 to extinguish the display from the staggered registers. Thus, the display of minutes is separated from that of seconds by the space of one displayer (displayer 823).

Although the count of the call duration starts from the person called answering, the display of this duration only takes place at the end of a predetermined time, e.g. 40 seconds.

CHAPTER VIII. DETECTOR OF THE REPLY OF THE PERSON CALLED AND OF THE CALLER PICKING UP THE RECEIVER (FIG. 10)

FIG. 10 shows the detector of the reply of the person called (Rd signal) and the manual removal of the receiver (DM signal).

Photo-transistors 913 and 914 of opto-electronic coupling devices (which are respectively associated with the electroluminescent diodes 713 and 714) are connected to a flip-flop 950 which changes state when, on the person called answering, the polarity of the line wires is reversed. Flip-flop 950 is connected via AND gates 952 and 953 to a flip-flop 951 which supplies the Rd signal.

Photo-transistors 911 and 912 connected to the telephone line $L_1$, $L_2$ detect the manual removal of the receiver. They are connected via an OR gate 954 and an AND gate 955 to a flip-flop 956 which supplies the DM signal for the manual removal of the receiver.

AND gates 952, 953, 955 are opened by a detection control signal CD which positions a flip-flop 957. This CD signal is either the signal $PL.\overline{PN}.\overline{AN}.\overline{X}$ supplied by AND gate 114 for the control of mono-stable circuit MS 60 in the case of the first number when there are two, or the DC signal if it is the second number or a single number.

Flip-flop 957 is returned to the inoperative state in the same way as flip-flops 951 and 956 when no further supply current is circulating on telephone line L1, L2 due to gate 959.

The AND NO gate 958 produces the signal $\overline{Rd.DM}$ which leads to zeroing RZ.

As stated hereinbefore the Rd signal supplied by flip-flop 951 is applied to the AND gate 873 of the device for displaying the length of call through which pass the clock pulses at a frequency of 1 Hz. Counters 881, 882, 884 and 885 start counting when 873 opens and when the tens counter 882 reaches 4 flip-flop 874 giving the delay display signal AD is brought into the state one. The duration count is displayed. The Rd signal stops the mono-stable circuit MS 60 without zeroing and triggers mono-stable circuit MS 20. If during a period of 20 seconds from the appearance of Rd the operator has not picked up the hand-set zeroing takes place and the apparatus returns to the neutral state. If within a period of 20 seconds the operator picks up the hand-set, DM becomes equal to 1 and the condition $\overline{Rd.DM}$ triggers a zeroing action. The apparatus returns to the neutral state, the red indicator lamp is extinguished and the green indicator lamp lights up. However, in this state Rd = 1, M = 1 and AD = 1, whereby AD = 1 means that the multiplexers are validated in the duration display position.

When the correspondent hangs up Rd = 0. Gate 873 closes and the duration counter stops counting. The duration of the call remains displayed.

When the operator hangs up DM = 0 and zeroing takes place. Via AND gate 875 condition $\overline{Rd.DM}$ zeroes flip-flop 74 giving AD signal and the duration counters are brought into the inoperative state.

CHAPTER IX: TONE DETECTOR (FIG. 11)

The tone detector detects the invitation to transmit tone (TO signal).

The analogue tone signal is transformed into pulses of the same frequency as the analogue signal in a pulse generator circuit. These pulses are applied to two cascade-connected re-triggerable mono-stable circuits MS 12 and MS 13. The switching duration of MS 12 is longer than the period between two pulses of the signal. Thus, if the pulses are applied in a permanent manner, MS 12 does not return to zero. When MS 12 is triggered it itself triggers MS 13 whose switching time is two seconds. AND gate 1002 receives output Q of MS 12 and output $\overline{Q}$ of MS 13. Immediately MS 12 is triggered signal $\overline{Q}$ of MS 13 is zeroed. The signal from MS 12 arrives at gate 1002 with a time lag due to the integrating circuit 1003. If all the other inputs are at one at the end of 10 seconds MS 13 returns to zero and its output $\overline{Q}$ to one. The signal from MS 12 is still present so that the TO signal is triggered. It is this signal which triggers the transmission of the number because it is applied to OR gate 223 (FIG. 4) which triggers MS 2.

However, if the signal applied to MS 12 momentarily ceases for the period of two seconds, MS 12 returns to zero. The input of gate 1002 connected to MS 12 is at zero. When $\overline{Q}$ of MS 13 returns to one at the end of two seconds there will be no TO signal.

AND gate 1002 also receives $\overline{TR}$, $\overline{CCE}$, Rd, $\overline{MS\ 60}$ and L signals. As a result of the L signal the tone detector is only validated when the apparatus is in the reading state, i.e. transmitting a number. The other conditions $\overline{CCE}$, $\overline{MS\ 60}$ and $\overline{Rd}$ inhibit the detector as soon as transmission is started. Finally, if the red key TR is operated before the end of two seconds gate 1002 is inhibited and there is no TO signal. This occurs when the TR key is depressed twice in succession to transmit the second number without passing via the first.

CHAPTER X: PROGRAMMER (FIGS. 14a and 14b)

The programmer will be described whilst explaining the operation of the apparatus.
A. Neutral position (N)
A1. Register selection To record the number of a correspondent it is firstly necessary to select the memory location register in which it is to be stored. In the same way to transmit the number of a correspondent it is necessary to select the register in which his number is stored.

With the apparatus in the neutral state and the green indicator lamp illuminated, striking two digits of the number of the memory location register leads to the display of this number on displayers 421 and 422.

If in error the operator strikes a number of two digits equal to or greater than 64 which corresponds to no register, the signal (<64) which becomes equal to zero passes through gate 1208 (FIG. 12) and opens the AND gate 1205 via which the astable circuit 1207 despatches pulses to the green indicator lamp 1201 which blinks.

The signal (<64) also serves to inhibit the reading control in the store by preventing, when it passes to zero the opening of gate 1109 which controls flip-flop 1110 giving the signal L and the writing control of the store by preventing the opening of gate 1118 giving the signal E.

A2. Each depression of the digital key produces the strobe signal which triggers the mono-stable circuits MS 1 and MS 2, leading to:

$$N.(\text{end of MS 2}) = b \tag{1}$$

$$b = AN \tag{2}$$

These conditions are given by the AND gate 1101, the OR gate 1102 and the flip-flop 1103 giving the signal AN. The mono-stable deleting circuit MS 9 (FIG. 9) is triggered via gate 1104 by the signal EF. Throughout the switching period of MS 9 blank signals enter the staggered registers 81 to 84 as a result of the clock pulses supplied by the astable circuit 85 via AND gate 850 opened by the mono-stable circuit MS 9. The previous number is therefore cancelled.

When MS 9 has stopped switching we have:

$$AN \cdot \overline{MS\ 9} \cdot 85 \cdot \overline{MS\ 5} = \text{start of } MS\ 3 \tag{3}$$

via gate 1105. Mono-stable circuit MS 3 triggers a storage cycle causing the character read to enter register 51. The display is validated by the condition:

$$AN \cdot \overline{PN} \cdot \overline{BL} \cdot (<64) = VA \tag{4}$$

as a result of gate 1106, and at the end of the storage cycle as a result of AND gate 871 and OR gate 872;

$$(\text{end of MS 4}) \cdot VA = \text{start of } MS\ 10 \tag{5}$$

The mono-stable display circuit MS 10 switches and when it has used up its time lag:

$$\text{end of MS 10} = \text{clock pulses} \tag{6}$$

The content of register 51 enters staggered registers 81 to 84. Condition 85·MS 9 applied to gate 1105 then starts a new cycle. The characters successively enter the staggered registers and are displayed.

A3. If there are two numbers in the memory store formula (4) shows that display validation VA is inhibited by PN. The cycle continues without modification of the display until the arrival of signal C 46Z (counter 46 empty) which zeros flip-flop 1103 supplying signal AN. Formula (3) shows that the sequence then stops with $\overline{AN}$.

As the flip-flop 89 is zeroed, when the sequence has reached the character PL we have:

$$PL \cdot (\geq 6) = PN \quad (7)$$

i.e. flip-flop 58 (FIG. 6) has passed to one and:
$$PN \cdot X = \text{display of 1 in displayer 829} \quad (8)$$

A4. If there is only a single number in the memory store formula (4) shows that it is BL which stops the display validation. As there has been no PN displayer 829 remains extinguished.

The above shows that the depression of a digital key in the neutral position triggers off the deletion of the preceding number, then the display of the single number or the first number contained at the displayed address. Moreover, in the latter case a 1 appears in displayer 829 indicating that there are two numbers at this address.

A5. If by error the address dialled is greater than or equal to 64 deletion takes place but formula (4) shows that no displaying takes place. This, together with the blinking of green indicator lamp and the impossibility of passing to the state E or the state L indicates the error. A simple examination of the address displayers 421, 422 confirms this. It is then merely necessary to correctly re-dial the address.

B. WRITING POSITION (E)

B1. Passage into the recording position takes place by depressing the blue key TB. The flip-flop 1119 which supplies the signal $E_1$ is thus brought into the state one via AND gate 1118 which besides the TB signal receives the signal C 46Z and the signal (<64).

Signal $E_1$ gives rise to the signal E in gate 1126 and the latter brings about the illumination of blue indicator lamp 1203 via AND NO gate 1213. If, however, the address dialled is a protected address the TB·$\overline{NP}$ condition brought about in the AND gate 1124 makes the green indicator lamp 1201 blink, the AND gate 1205 being open to the pulses provided by the astable flip-flop 1207. The depression of TB in the presence of the signal C 46Z does not trigger off the strobe signal as the gate 311 is blocked.

If at a given memory location register address one or two numbers are already recorded and it is desired to record a second number or change that already located therein without it being necessary to again record the first, it must be possible to initiate a rapid cycle without writing which stops after the last digit of the second number.

Two cases can exist:
1. There is only one number at the selected address, when the character which follows the final digit of the said number is a blank BL.
2. There are two numbers at the selected address when the character which follows the final digit of the first number is a pause PL.

In order to miss the first number it is necessary to depress twice the blue key TB. Flip-flop 1119 is in the form of a binary pulse divider, i.e. it changes state each time that it receives a pulse. Zeroing a flip-flop 1119 brings about the switching of a second flip-flop 1125 which produces the signal $E_2$. Signal E is then obtained at the output of the OR gate 1126 connected to the output of one of the two flip-flops 1119 and 1125 leading to:

$$E = E_1 + E_2$$

Thus, depending on whether one has depressed the TB key once or twice signal E either coincides with $E_1$ or is equal to the sum $(E_1 + E_2)$.

Signal $E_2$ controls a rapid display cycle by condition:

$$E_2 \cdot 85 \cdot MS\ 9 \cdot \overline{PN}$$

brought about by gates 1127 and 1105.

The condition E authorising writing in the store is replaced by the condition:

$$E_1 + E_2(BL + PN)$$

$(BL + PN)$ is formed by the OR gate 1128. The intersection of this sum by $E_2$ is formed in the AND gate 1129 and the sum with $E_1$ in the OR gate 1130. At the output of 1130 signal W is encountered which authorises via AND gate 52 (FIG. 6) writing in store 50. Thus, it is only at the end of the first number that the store is in the writing position.

If there is only a single number at the selected address the first blank following the first number must be replaced by a pause before writing the second. However, if there are two numbers at the selected address the pause following the first number must be retained when the second number is changed. This is brought about by the following condition of preventing an increment on the ordinal counter 46;

$$E_2 \cdot \overline{(BL \cdot \overline{PN})}$$

by means of the AND gate 1131 which gives the first intersection BL·$\overline{PN}$ and the AND gate 1132 which gives the second intersection by $E_2$. At the output of gate 1133 in which $E_1$ is added to the previous expression the signal (+1 in 46) is encountered which increments ordinal counter 46.

Thus, on the basis of the above condition the replacement of the blank following the first number by a pause before writing the second number takes place automatically. In fact the operator has her finger on the TB key because she has just depressed it twice to pass to the location of the second number; thus, $E_2 = 1$, $BL = 1$ because a blank and PN equals zero is read, i.e. $\overline{PN} = 1$. The incrementation prevention condition is obtained and the pause is substituted for the blank. B2. As the depression of the blue key TB has brought the apparatus from the N state to the E state as shown in B1, we have (gate 1104):

$$TB \cdot E \cdot C\ 46Z = \text{start of MS 9} \quad (9)$$

Thus the displayed number is deleted.

The depression of a digital key triggers off as in the neutral position the strobe signal, then the mono-stable circuits MS 1 and MS 2, and we have (gate 1105):

$$\overline{N}(\text{end of } MS\ 2) = \text{start of } MS\ 3 \quad (10)$$

hence a writing cycle in the store. The condition E·$\overline{TR}$ validates the display (gate 1106):

$$E \cdot \overline{TR} = VA \quad (11)$$

and the character struck is displayed. The same occurs relative to the following characters: If a number with a prefix is dialled it is necessary to depress the blue key TB to introduce a pause signal PL, and the latter is displayed in the form ]. The signal PN is not produced because there is no (≧6) signal.

B3. If only a single number is recorded it must be terminated by depressing the red key TR so as to feed the blank signals BL into the memory store. Formula (11) shows that the display is no longer validated.

B4. If it is desired to record two numbers at the same address TB is depressed after the final digit of the first number to record a PL pause which leads to:

$$PL \cdot (\geq 6) = PN \quad (12)$$

and $$TB \cdot E \cdot PN = \text{start of } MS \ 9 \quad (13)$$

as a result of gate 1104. Thus the first number recorded is deleted to permit the display of the second. The end of the second number is effected as for a single number, i.e. by depressing TR.

B5. On initially depressing TB one passes to writing leading to:

$$E \cdot \overline{X} = \text{display of 1 in displayer } 829 \quad (14)$$

at the OR gate 893 and at the AND gate 891.
On depressing TB a second time we have:

$$E \cdot PN = X \quad (15)$$

due to gate 892 and $$(E + PN) \cdot X = \text{display of 2 in displayer } 829 \quad (16)$$

due to gates 890 and 893.

B6. If the TB key is struck twice in succession to miss the first number and write a second number without deleting the first, cases B2 and B4 are successively obtained. Thus the previously displayed number is deleted and the second number displayed.

C. READING POSITION (L)

There are several different reading sequences each depending on the previous situation. These different cases will be examined hereinafter after noting that when not in the E state the depression of the TR key zeros the address counter 46 and the register 51. Thus:

$$TR \cdot \overline{CCE} = \text{start of } MS \ 5 \quad (17)$$

due to gate 1107 and:

$$MS \ 5 \cdot \overline{E} = RZ \ 46 \text{ and } RZ \ 51 \quad (18)$$

due to the gate 1108.

C1. There is a single number at the selected address.
As the apparatus is in the neutral state we have:

$$L = 0, X = 0 \text{ and } PN = 0$$

because there is only a single number.
We successively have:

$$L = 1 \text{ (end of } MS \ 5) \cdot \overline{E} \cdot (<64) = AN = 1 \text{ (start of } MS \ 9) \quad (19)$$

The first and second conditions are obtained as a result of AND gate 1109 whose output signal switches flip-flop 1110 giving signals L and $\overline{L}$ and flip-flop 1103 giving signals AN and $\overline{AN}$. The said latter flip-flop in the state one produces the deleting signal EF due to gate 1104. The previously displayed number is deleted.

At the end of the switching period of MS 9 we have:

$$AN \cdot \overline{MS \ 9} \cdot 85 \cdot \overline{MS \ 5} = \text{(start of } MS \ 3) \quad (3')$$

via gates 1135 and 1105. Monostable circuit MS 3 triggers off a storage cycle which causes the character read to enter register 51. The display is validated by the condition:

$$\overline{AN \cdot PN \cdot BL \cdot N2} = VA \quad (4')$$

due to gates 1136 and 1106 (the formation of N2 will be examined subsequently) and at the end of the storage cycle due to gate 871 conditions (5), then condition (6) are obtained. The content of register 51 then passes into staggered registers 81 and 84. New cycles are recommenced as in A1. After reading the final digit of the recorded number a blank BL is read and consequently $\overline{BL}$ equals zero and through (4') VA equals zero. There is no further change to the display and the single number is displayed.

If the TR key is depressed a second time, e.g. because an occupied signal has been received, L = 1 is obtained but there is no modification to the preceding process because L does not occur in formulae (3) and (4').

C2. There are two numbers in the selected address.
As the apparatus is in the neutral state, we have:

$$L = 0, X = 0, PN = 0 \text{ or } 1$$

PN *is equal to* 0 if a recording is to be carried out and at one if a memory location register address had been keyed.

The process is the same as in C1 except that at the end of validation, i.e. the condition VA = 0 results not from reading the blank $\overline{BL} = 0$ but from the reading of a pause $\overline{PL} = 0$ (therefore $\overline{PN} = 0$). The first number is displayed.

If the second number is desired either without waiting for the first or after a transmission of the first number without result, the TR key is again depressed and we have:

$$L = 1, X = 0, PN = 1$$

Gate 1111 is then open and the flip-flop 1112 giving signal N2 is brought into the state one on MS 5 being triggered, i.e. we have:

$$MS \ 5 \cdot L \cdot PN \cdot \overline{X} = N2 \quad (20)$$

Signal N2 brings flip-flop 89 giving signal X into state one via gate 894 and we have:

$$X \cdot PN = \text{display of 2 in displayer } 829 \quad (21)$$

The flip-flop 1103 comes into the state one (AN = 1) in the same way as mono-stable circuit MS 9 leading to deletion and then the rapid sequence commences:

$$(AN + N2) \cdot \overline{MS \ 9} \cdot 85 \cdot \overline{MS \ 5} = \text{(start of MS 3)} \quad (3'')$$

validation of the display being given by:

$$\overline{AN \cdot BL \cdot N2} = VA \quad (4'')$$

due to gate 1106. The validation signal only becomes equal to zero again when a blank signal is read. Thus, two numbers enter the display device in seccession. However, when the sequence reaches pause PL separating two numbers we have:

$$AN \cdot X \cdot PL = \text{(start of } MS \text{ 9)} \qquad (22)$$

Thus the first number read is deleted and the sequence is stopped which will resume on MS 9 being de-energised.

Thus signal C 46 Z which cancels out signal AN because it zeros flip-flop 1103 does not stop the sequence because it is (AN + N2) which is involved in condition (3"). When the sequence reaches PL for the second time we have:

$$PL \cdot \overline{AN} = \overline{N2} \qquad (23)$$

due to AND gate 1113, i.e. flip-flop 1112 is zeroed. The validation condition (4") is stopped by $\overline{N2}$. The second number is then displayed.

If it is desired to display the first number after twice depressing TR (in succession or after transmission without result) the conditions are:

$$L = 1, PL = 1, X = 1.$$

As in the case of C1 and C2 the depression of TR triggers MS 5 but the condition (20) is not verified because $\overline{X} = 0$, thus flip-flop 1112 giving N2 remains in the zero state. The end of switching of MS 5 gives AN = 1 (flip-flop 1103 in the state one) and MS 9 = 1 (mono-stable deleting circuit MS 9 in the state one) which results in case C1 after bringing flip-flop 1110 giving signal L to one, i.e. after the switching time of MS 9 in condition (3).

Thus, it is possible to transmit and display successively the first number, the second, the first, the second and so on.

To facilitate the reading of FIGS. 14a and 14b the following table indicates the signals respectively appearing on the input and output terminals:

| Input terminals ○ | Output terminals |
|---|---|
| 1 $\overline{PL}$ | 1 end of MS 2 |
| 2 $\overline{C46Z}$ | 2 $\overline{CCE}$ |
| 3 TR | 3 (<64) |
| 4 BL | 4 $\overline{AL}$ |
| 5 85.$\overline{MS9}$ | 5 $\overline{C46Z}$ |
| 6 $\overline{PN}$ | 6 TO |
| 7 MS2 | 7 $\overline{TP.NP}$ |
| 8 $\overline{BL}$ | 8 N2 |
| 9 (<64) | 9 Val.CD |
| 10 $\overline{TR}$ | 10 $\overline{TR}$ |
| 11 initialisation | 11 PN |
| 12 X | 12 $\overline{N}$ |
| 13 PL | 13 N |
| 14 TB | 14 L |
| 15 (end of DM) | 15 $\overline{TR}$ |
| 16 Rd | 16 W |
| 17 DM | 17 + 1 in 46 |
| 18 TO | 18 E |
| 19 NP | 19 RZ 46 and 51 |
| 20 $\overline{X}$ | 20 $\overline{MS\ 60}$ |
| 21 PN | 21 $\overline{MS20 + MS60}$ |
| 22 C46Z | 22 AN.$\overline{N2}$ + RZ |
| 23 (end of MS2) | 23 EF (deletion) |
| 24 $\overline{Rd.DM}$ | 24 VA (validation) |
| 25 $\overline{CCE}$ | 25 start of MS 3 |

CHAPTER IX: INDICATOR LAMPS (FIG. 12)

Green indicator lamp 1201, red indicator lamp 1202 and blue indicator lamp 1203 are electroluminescent diodes whose anodes are connected to the +HT and whose cathodes are respectively connected to the three AND NO gates 1211, 1212, 1213. For an indicator lamp to light up it is necessary that the output of its control gate is at zero, i.e. the two inputs of this gate are at one. One of the inputs of each gate receive a positioning signal (N+Rd) (gate 1204), L and E for gates 1211, 1212, 1213 respectively. The second input of gate 1211 receives a signal from AND NO gate 1205 whose inputs are connected to an AND NO gate 1208 and an astable flip-flop 1207. The second inputs of gates 1212 and 1213 receive a signal from the AND NO gate 1206 whose inputs are the same as those of the AND NO gate 1205 except that 1205 is connected to the output one of flip-flop 1207, whilst 1206 is connected to the zero output of the said flip-flop. The inputs of gate 1208 receive the signals (<64), TB.NP MS 20 + MS 60, as well as a signal DC.C46Z to which reference was made hereinbefore.

D. Apparatus in the neutral state (N)

If the selected memory location register address is below 64, the other inputs of gate 1208 also being at one, the output of 1208 is at zero and that of 1205 is permanently at one.

If an address greater than 64 is selected the input (<64) is at zero. The output of 1208 is at one and the output of 1205 passes from zero to one at the rhythm of the astable flip-flop 1207. The green indicator lamp 1201 blinks.

If a protected address has been selected it has been seen that the apparatus does not pass to E when the blue key is depressed due to the gate 1118 which receives the NP signal. In fact we remain at N and the signal TB.NP passes to zero and traverses OR gate 1208. Thus 1205 becomes conductive and the green indicator lamp 1201 blinks.

E. Apparatus in the writing position (E)

We pass into the writing position E by depressing the TB key. The blue indicator lamp 1203 is illuminated. If 16 characters are registered, at the end of the sixteenth character the ordinal counter 46 is empty, thus C 46Z = 0 and flip-flop 1134 giving the signal of the last digit DC is brought into the state one. The condition DC.$\overline{C46\ Z}$ constitutes an alarm signal which is applied to the gate 1208. Gate 1206 is then open and the blue indicator lamp 1203 blinks.

In cases D and E the blinking of an indicator lamp indicates an error on the part of the operator. This can consist of the display of an address equal to or above 64, the absence of a key for recording a number at a protected address and the recording of a number with more than 16 characters.

F. Apparatus in the reading position (L)

We pass into the reading position by simply pressing the red key TR and incorrect operation is impossible. However, as soon as the red key is pressed mono-stable circuit MS 20 is triggered waiting for signal TO. Signal MS 20 is applied to one of the inputs of gate 1208 and the red indicator lamp starts to blink. If the signal TO does not arrive during this period the end of MS 2 brings about a return to zero and the apparatus returns to the neutral state in which the red indicator lamp is permanently illuminated.

If during the 20 second delay period key TR is despressed a second time this leads to display and the transmission of a second number and a further 20 second waiting period for signal TO because mono-stable circuit MS 20 is re-closeable within this time delay.

If TO is detected during the 20 second delay period MS 20 is zeroed without bring about a zeroing operation. The blinking of 1202 stops. It remains illuminated without blinking until the number has been transmitted. At this time the mono-stable circit MS 60 is triggered. Signals MS 20 and MS 60 are introduced at the OR gate and it is the sum thereof which controls gate 1208. Thus, the red indicator lamp 1202 starts to blink again. When the correspondent picks up the receiver flip-flop 951 (FIG. 10) giving Rd passes into the state one. The correspondent is on the line but it is necessary to pick up the receiver to bring about communication. Whatever the time at which Rd is obtained within the 60 seconds of MS 60 the passage into the state one of flip-flop 951 causes the stoppage of MS 60 without zeroing and the triggering of MS 20. The receiver must be lifted within the 20 seconds following Rd, if not the apparatus returns to the neutral state. It can be seen that signal Rd opens gate 1204 which causes the green indicator lamp 1201 to blink. Thus between the person called answering and the picking up of the receiver of the caller, the green and red indicator lamps both blink and as they are connected to the two outputs of astable flip-flop 1207 they blink in phase opposition.

The operation of the indicator lamps during the reading phase can be summarised as follows:

Up to TO red lamp 1202 blinks

During transmission red lamp 1202 permanently illuminated

Awaiting Rd red lamp 1202 blinks

Rd obtained and up to DM red lamp 1202 blinks and green lamp 1201 blinks

CHAPTER X: POWER SUPPLY TO STORE (FIG. 13)

Reference is now made to FIG. 13 which shows the power supply device for the store which comprises a transformer 1401, a rectifier bridge 1402, a capacitor 1403 in parallel at the output of the rectifier bridge and a Zener diode 1404 in series with a resistor 1405, all being parallel with capacitor 1403. The d.c. voltage at the terminals of Zener diode 1404 serves on the one hand to energise the booster battery 1406 via transistor 1407 and on the other to energise the coil of a relay 1408 whose contact 1409 controls the polarisation of switching transistor 1410.

An astable flip-flop 1411 supplied by battery 1406 has its output connected to the base of tansistor 1410. When power is being supplied normally by the mains booster battery 1406 is charged and transistor 1410 conductive. The memory store is continuously supplied. In the case of a mains failure, the booster battery supplies astable flip-flop 1411 and the latter emits its maintaining pulses to the store. As an examle the frequence of the astable flip-flop is 1000 Hz and the maintaining pulses have a duration of $2\mu s$ for a recurrence period of 1 ms.

Although the invention has been explained relative to an exemplified embodiment, obviously variants and additions are possible thereto without passing beyond the scope of the invention as defined in the following claims. The following are examples of variants or additions:

1. The telephonne used in the apparatus can be of any known type, e.g. of the type without a hand-set or of the type with only a hand-set and no base.

2. The keyboard can simultaneously serve as the keyboard for a computer incorporated in the apparatus.

3. The displayer can serve as an electronic clock when the apparatus is being used.

What is claimed is:

1. An automatic telephone call generator comprising a keyboard having digital keys emitting digital signals and only two function keys each emitting a special signal, a memory store comprising a plurality of memory location registers having a predetermined capacity, an addressing device for the said memory location registers of the said store, means for writing the digits of the coded call numbers in binary coded form in the said store, a reading register of the digital signals read in the store, a call pulse emitter and a control circuit of the said call pulse emitter, wherein each memory location register can contain one or two call numbers each having a random number of digits, whereby the total number of digits is equal to or less than the memory location register capacity less one unit, wherein the two call numbers of one and the same memory location register are on recording, separated by a first special signal upon actuating one of said function keys, wherein the final part of the memory location register beyond the first number, if there is only one, or beyond the second number if there are two is filled by second special signals upon actuating the other of said function keys, and wherein the apparatus comprises detectors of the first and second special signals, means for commencing the reading of the store either at the start of a selected memory location register or at the first special signal detected by the said first special signal detector and for stopping this reading when a second special signal is detected by said second special signal detector.

2. An automatic telephone call generator according to claim 1, wherein the means for writing the digits of the call numbers in the store comprise means for writing a second call number in the store when it contains only one call number without it being necessary to re-write the latter or to change the first or second number when two call numbers have been recorded in the store without it being necessary to cancel the other or re-write it, whereby the said writing and changing means comprise a first flip-flop in the form of a binary divider controlled by said one of the function keys, a second flip-flop controlled by the second switching of the first flip-flop, an OR gate connected to the outputs of the two flip-flops, hence the output signal of the said OR gate has two possible compositions depending on whether the said one function key has been depressed once or twice, means for controlling the writing in the store by a first special signal alone or by a second special signal when one or other of the special signals is read in the store, so that the store is not positioned in writing until the end of scanning the first number.

3. An automatic telephone call generator according to claim 1, which comprises a staggered register, a source of recurrent deleting pulses of the staggered register, means for selectively connecting the said staggered register either to the reading register or to the said recurrent pulse source, a time counter, a displayer and means for selectively connecting the said displayer either to the staggered register so that it displays the call number to be transmitted, or to the time counter so that it displays the duration of the telephone call.

4. An automatic telephone call generator according to claim 1, comprising a detector for an invitation to transmit tone circulating on the telephone line to which detector the generator is connected, whereby the said detector controls the control circuit of the call pulse emitter, said generator further comprising additionally means for detecting the polarity reversal signal of the supply current on the line wires indicating that the person called has answered, means for triggering the time counter by the signal indicating that the person called has answered and for controlling by the said signal means for the selective connection of the said counter to the displayer and means for detecting and indicating line occupancy by the caller lifting the receiver.

5. An automatic telephone call generator according to claim 4, wherein the detector of the invitation to transmit tone comprises a pluse generator transforming the said tone formed by a sinusoidal signal into a pulse train of the same recurrence frequency as the said sinusoidal signal, a first mono-stable flip-flop receiving the said pulse train and having a switching time which is longer than the time lag between the pulses of the train, a second mono-stable flip-flop in cascade with the first having a predetermined switching period and an AND gate connected to the working output of the first mono-stable flip-flop by a time lag circuit and to the rest output of the second mono-stable flip-flop so that there will be a signal at the output of the said AND gate at a time following the appearance of the tone which is equal to the said predetermined period and if the tone ceases during a time equal to the time lag of the time lag circuit there is no signal at the output of the AND gate.

6. An automatic telephone call generator according to claim 4, wherein the control by the signal indicating that the person called has answered of the means for the selective connection of the time counter to the displayer takes place with a predetermined time lag.

7. An automatic telephone call generator according to claim 1, wherein the keyboard emitting the digital signals and the special signals is connected both to the addressing device of the memory location registers of the store for addressing the latter and to the means for writing in the store so that the call numbers enter the latter, whereby these connections are made through a selection circuit controlled by a key which emits a special signal which, in addition to the said special signal produces a function signal addressed to the said selection circuit.

8. An automatic telephone call generator according to claim 7, wherein the addressing device of the memory location registers of the store comprises an overflow terminal and means for making an overflow signal appear therein where the memory location register address dialled on the keyboard exceeds the capacity of the store, and wherein the selection circuit controlling the connections of the keyboard to the addressing device and to the writing means in the store has inhibitor means controlled by the said overflow signal.

9. An automatic telephone call generator according to claim 7, wherein the memory location register addressing device of the store is connected to an address displayer.

10. An automatic telephone call generator according to claim 7, wherein the memory location register addressing device of the store comprises a protection terminal and means for making a protection signal appear therein when it is forbidden to modify, replace or cancel the call number written at the address dialled on the keyboard and wherein the selection circuit controlling the connections of the keyboard to the addressing device and to the writing means in the store has inhibitor means of the said writing means controlled by the said protection signal and means for indicating an attempted modification replacement or cancellation of the said number.

11. An automatic telephone call generator according to claim 10, wherein the addressing device of the memory location registers of the store comprises terminals relative to the bits of the different binary weights of the address and wherein replaceable conductive U-links connect the said terminals to the protection terminals so that if the U-links corresponding to the bit of weight ($2^i$) of the address is eliminated the addresses between ($2^i$ and $2^i - 1$) are no longer protected.

12. An automatic telephone call generator according to claim 1, which comprises means for detecting polarity reversal on the line wires producing the answering signal from the person called, means for detecting occupancy of the line by the call generator producing a signal resulting from the caller lifting the receiver, a first time lag circuit and a second time lag circuit returning the apparatus to the inoperative position at the end of the their respective time lags unless they are stopped beforehand by control signals, means for selectively triggering the first time lag circuit by a keyboard key which produces a special signal and a function signal addressed to the said first time lag circuit, means for stopping during its time lag the said first time lag signal by an invitation to transmit tone, means for selectively triggering the second time lag signal by a signal indicating the end of transmission of the call number, means for stopping during its time lag the said second time lag circuit by the signal of the person called answering, means for selectively triggering the first time lag signal by the answering signal of the person called and means for stopping during its time lag the said first time lag circuit by the signal of the caller lifting the receiver and means for indicating the putting into operation of one or other of the time lag circuits.

13. An automatic telephone call generator according to claim 1 wherein the two parts of a telephone call number comprising a prefix and the actual number are on recording separated by the first special signal, wherein the addressing device of the memory location registers of the store comprises means for detecting the position of the first special signal making it possible to know whether the said first special signal has in its call number a position which is before or after a predetermined position, i.e. separates two numbers or a number and its prefix and wherein the control circuit of the call pulse emitter comprises means controlled by the detector of the first special signal for stopping transmission of the call number at the end of the prefix and means controlled by the invitation to transmit tone detector and by the said means for detecting the position of the first special signal for resuming transmission of the call number at the start of the actual number.

14. An automatic telephone call generator according to claim 13, wherein the means for detecting the position of the first special signal in the call number having a prefix make it possible to know whether the said first special signal has a predetermined position.

15. An automatic telephone call generator according to claim 1, which comprises a special displayer indicating nothing, 1 or 2 depending on whether the number to be written or to be read in the store is single or is the first or second number written in the selected memory location register, as well as an associated display selection circuit controlling the said special displayer, and means for detecting the position of the first special signal in the call number, whereby the said display selection circuit is controlled on the one hand by the special signal emitting keys which, in addition to the said special signal produce function signals addressed to the said display selection circuit and on the other hand by the detector of the first special signal and by the means for detecting the position of the first special signal in the call number in such a way that the first special signal controls said display selection circuit only when detected in the number at a position above a predetermined position.

16. An automatic telephone call generator according to claim 1, wherein the store is energised by the mains, rectified via a booster battery wherein the power supply device comprises an astable flip-flop and switching means controlled by a mains failure so that the voltage of the booster battery is substituted by the pulses of the astble flip-flop for the supply of the said store.

* * * * *